(12) United States Patent
Lee et al.

(10) Patent No.: US 11,916,310 B2
(45) Date of Patent: Feb. 27, 2024

(54) ELECTRONIC DEVICE INCLUDING ANTENNAS FOR ANGLE OF ARRIVAL MEASUREMENT

(71) Applicant: Samsung Electronics Co., Ltd., Suwon-si (KR)

(72) Inventors: Muyeol Lee, Suwon-si (KR); Jongyeon Kim, Suwon-si (KR); Eunsoo Park, Suwon-si (KR); Woosup Lee, Suwon-si (KR); Sehwan Choi, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 17/215,585

(22) Filed: Mar. 29, 2021

(65) Prior Publication Data

US 2021/0320417 A1 Oct. 14, 2021

(30) Foreign Application Priority Data

Apr. 8, 2020 (KR) .................. 10-2020-0042941

(51) Int. Cl.
*G01S 13/76* (2006.01)
*H01Q 9/04* (2006.01)
(Continued)

(52) U.S. Cl.
CPC .......... *H01Q 9/0407* (2013.01); *G01S 13/767* (2013.01); *H01Q 1/2283* (2013.01); *H01Q 1/48* (2013.01); *H01Q 21/065* (2013.01)

(58) Field of Classification Search
CPC ...... G01S 13/765; G01S 13/767; G01S 3/043; G01S 3/12; G01S 3/48; G01S 5/12;
(Continued)

(56) References Cited

U.S. PATENT DOCUMENTS 8,681,048 B2 3/2014 Nishida
10,477,675 B1* 11/2019 Kim .................. H05K 1/0219
(Continued)

FOREIGN PATENT DOCUMENTS

KR 10-2017-0025422 A 3/2017

OTHER PUBLICATIONS

International Search Report dated Jul. 13, 2021, issued in International Application No. PCT/KR2021/003870.
(Continued)

*Primary Examiner* — Timothy A Brainard
(74) *Attorney, Agent, or Firm* — Jefferson IP Law, LLP

(57) ABSTRACT

An electronic device including an antenna is provided. The electronic device includes a housing including a front surface plate, a rear surface plate, and a side surface member, a printed circuit board positioned within the housing, a first support structure, a second support structure, a patch antenna including a flexible printed circuit board disposed on one surface of the first support structure that faces the rear surface plate, a first conductive patch, and a second conductive patch disposed to be spaced apart from the first conductive patch, a conductive pattern disposed on one surface of the second support structure, and a wireless communication circuit electrically connected with the patch antenna and the conductive pattern, and the first conductive patch, the second conductive patch and the conductive pattern are fed from the wireless communication circuit.

20 Claims, 22 Drawing Sheets

(51) Int. Cl.
*H01Q 1/22* (2006.01)
*H01Q 1/48* (2006.01)
*H01Q 21/06* (2006.01)

(58) Field of Classification Search
CPC ......... G01S 7/006; G01S 7/03; H01Q 1/2283;
H01Q 1/243; H01Q 1/48; H01Q 1/526;
H01Q 21/065; H01Q 21/28; H01Q 5/25;
H01Q 9/0407; H01Q 9/0457
See application file for complete search history.

(56) References Cited

U.S. PATENT DOCUMENTS

| | | |
|---|---|---|
| 2016/0308276 A1 | 10/2016 | Chang et al. |
| 2018/0254870 A1 | 9/2018 | Dutz et al. |
| 2019/0056472 A1 | 2/2019 | Smith et al. |
| 2020/0014099 A1 | 1/2020 | Ghabra et al. |
| 2020/0021011 A1* | 1/2020 | Cooper ................ H01Q 3/2605 |

OTHER PUBLICATIONS

Korean Office Action dated Dec. 13, 2023, issued in a Korean Patent Application No. 10-2020-0042941.

* cited by examiner

ELECTRONIC DEVICE INCLUDING ANTENNAS FOR ANGLE OF ARRIVAL MEASUREMENT

CROSS-REFERENCE TO RELATED APPLICATION(S)

This application is based on and claims priority under 35 U.S.C. § 119(a) of a Korean patent application number 10-2020-0042941, filed on Apr. 8, 2020, in the Korean Intellectual Property Office, the disclosure of which is incorporated by reference herein in its entirety.

BACKGROUND

1. Field

The disclosure relates to an electronic device including antennas for measuring an angle of arrival (AOA). More particularly, the disclosure relates to an electronic device which can detect positions of external electronic devices positioned in all directions by having at least three different types of ultra-wide band (UWB) antennas arranged in some components (for example, a rear case or a shield can) of the electronic device.

2. Description of Related Art

With the enhancement of wireless communication technology, electronic devices are developing to provide even connectivity technology for providing various functions by connecting with other electronic devices, in addition to their own functions. For example, an electronic device may detect a position of an external electronic device (for example, an Internet of Things (IoT) device) disposed around the electronic device, and may control various functions of the external electronic device based on the detected position.

As connectivity technology is developing, there is a growing need for positioning technology for exactly detecting a position of an external electronic device disposed around an electronic device. A recent electronic device may apply a UWB communication technology to be able to acquire positioning information by transmitting and/or receiving a position detection message (or a "ranging message") to and/or from an external electronic device, and to precisely detect a position of the electronic device and/or a position of the external electronic device around the electronic device.

The above information is presented as background information only to assist with an understanding of the disclosure. No determination has been made, and no assertion is made, as to whether any of the above might be applicable as prior art with regard to the disclosure.

SUMMARY

An electronic device may include at least one ultra-wide band (UWB) antenna to detect a position of the electronic device or to detect a position of an external electronic device (for example, an Internet of things (IoT) device) by using UWB communication technology. For example, the electronic device may include two UWB antennas which are spaced apart from each other by a predetermined distance. The electronic device may measure a distance between the electronic device and the external electronic device and/or an angle of arrival (AOA) of a signal (for example, a radio frequency (RF) signal) received from the external electronic device through the two UWB antennas, and may detect a position of the external electronic device by using the measured distance between the electronic device and the external electronic device, and/or the AOA.

However, since the electronic device including the two UWB antennas theoretically measures only the AOA of a signal received within a range of about 180° with reference to the electronic device, it may be difficult to recognize whether an external electronic device is in a leftward direction or a rightward direction with reference to the electronic device.

For example, the electronic device may need to have at least three UWB antennas densely arranged therein within a designated distance (for example, $\lambda/2$ distance) in order to measure an AOA of a signal received in all directions (for example, about 360°). However, as electronic devices are becoming thinner to enhance the aesthetic property, and a plurality of electronic parts are arranged in electronic devices to perform various functions of the electronic devices, it may be difficult to guarantee a space for at least three UWB antennas to be densely arranged within a designated distance (for example, $\lambda/2$ distance) within an electronic device.

Aspects of the disclosure are to address at least the above-mentioned problems and/or disadvantages and to provide at least the advantages described below. Accordingly, an aspect of the disclosure is to provide an electronic device which can detect positions of external electronic devices positioned in all directions by having at least three different types of UWB antennas arranged in some components (for example, a rear case or a shield can) of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a front surface plate forming a front surface of the electronic device, a rear surface plate forming a rear surface of the electronic device, and a side surface member forming a side surface of the electronic device, a printed circuit board positioned within the housing and having at least one electronic component disposed thereon, a first support structure positioned between the printed circuit board and the rear surface plate, and formed with a conductive material, a second support structure disposed adjacent to the first support structure and formed with a nonconductive material, a patch antenna including a flexible printed circuit board disposed on one surface of the first support structure that faces the rear surface plate, a first conductive patch disposed on the flexible printed circuit board, and a second conductive patch disposed to be spaced apart from the first conductive patch, a conductive pattern disposed on one surface of the second support structure that faces the rear surface plate, and a wireless communication circuit electrically connected with the first conductive patch, the second conductive patch, and the conductive pattern, and the first conductive patch may be fed from the wireless communication circuit at a first point, the second conductive patch may be fed from the wireless communication circuit at a second point, and the conductive pattern may be fed from the wireless communication circuit at a third point.

In accordance with another aspect of the disclosure, an electronic device is provided. The electronic device includes a housing including a front surface plate forming a front surface of the electronic device, a rear surface plate forming a rear surface of the electronic device, and a side surface member forming a side surface of the electronic device, a printed circuit board positioned within the housing and having at least one electronic component disposed thereon, a first support structure positioned between the printed circuit board and the rear surface plate, and formed with a conductive material, a second support structure disposed adjacent to the first support structure and formed with a nonconductive material, a patch antenna including a flexible printed circuit board disposed on one surface of the first support structure that faces the rear surface plate, and a conductive patch disposed on the flexible printed circuit board, a first conductive pattern disposed on one surface of the second support structure that faces the rear surface plate, a second conductive pattern disposed on the one surface of the second support structure that faces the rear surface plate, and disposed to be spaced apart from the first conductive pattern, and a wireless communication circuit electrically connected with the conductive patch, the first conductive pattern and the second conductive pattern, and the conductive patch may be fed from the wireless communication circuit at a first point, the first conductive pattern may be fed from the wireless communication circuit at a second point, and the second conductive pattern may be fed from the wireless communication circuit at a third point.

In accordance with another aspect of the disclosure, an electronic device is provided. The electronic device includes a housing including a front surface plate forming a front surface of the electronic device, a rear surface plate forming a rear surface of the electronic device, and a side surface member forming a side surface of the electronic device, the side surface member of the housing including a first conductive portion, a first nonconductive portion disposed on one end of the first conductive portion, and a second nonconductive portion disposed on the other end of the first conductive portion, a support structure disposed adjacent to the first support structure and formed with a nonconductive material, a first conductive pattern disposed on one surface of the support structure that faces the rear surface plate, a second conductive pattern disposed on the one surface of the support structure that faces the rear surface plate and disposed to be spaced apart from the first conductive pattern, a printed circuit board positioned within the housing and including a ground, and a wireless communication circuit disposed on the printed circuit board, and electrically connected with the first conductive portion of the side surface member, the first conductive pattern, and the second conductive pattern, and the first conductive pattern may be fed from the wireless communication circuit at a first point, the second conductive pattern may be fed from the wireless communication circuit at a second point, the first conductive portion of the side surface member may be fed from the wireless communication circuit at a third point, and may be grounded to the ground of the printed circuit board at a fourth point, which is spaced apart from the third point.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
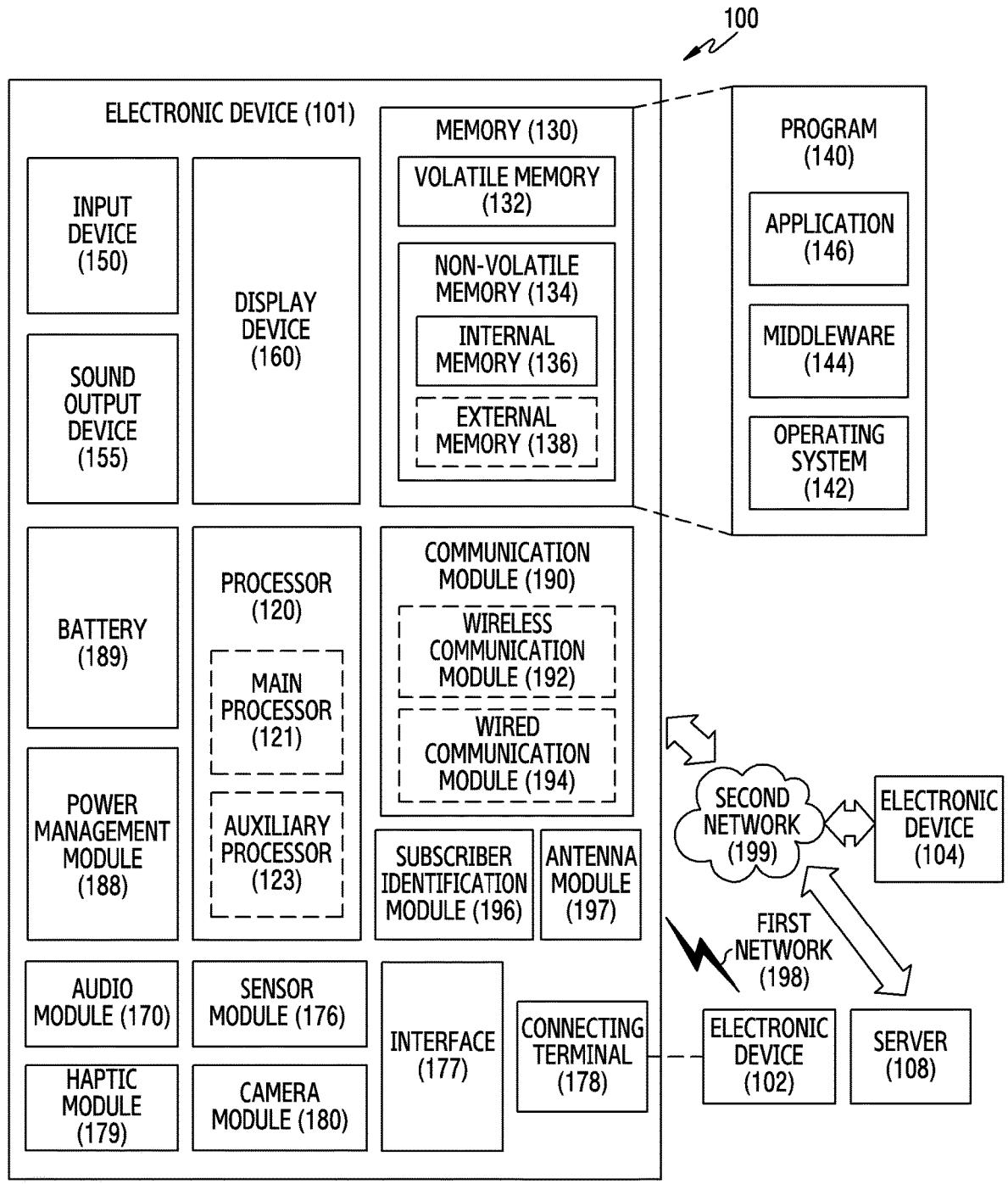
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In embodiments of the disclosure, at least one (e.g., the display device 160 or the camera module 180) of the components may be omitted from the electronic device 101, or one or more other components may be added in the electronic device 101. In embodiments of the disclosure, some of the components may be implemented as a single integrated circuitry. For example, the sensor module 176 (e.g., a fingerprint sensor, an iris sensor, an illuminance sensor, or the like) may be implemented as embedded in the display device 160 (e.g., a display).

The processor 120 may execute, for example, software (e.g., a program 140) to control at least one other component (e.g., a hardware or a software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, a hologram device, and a projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2A:
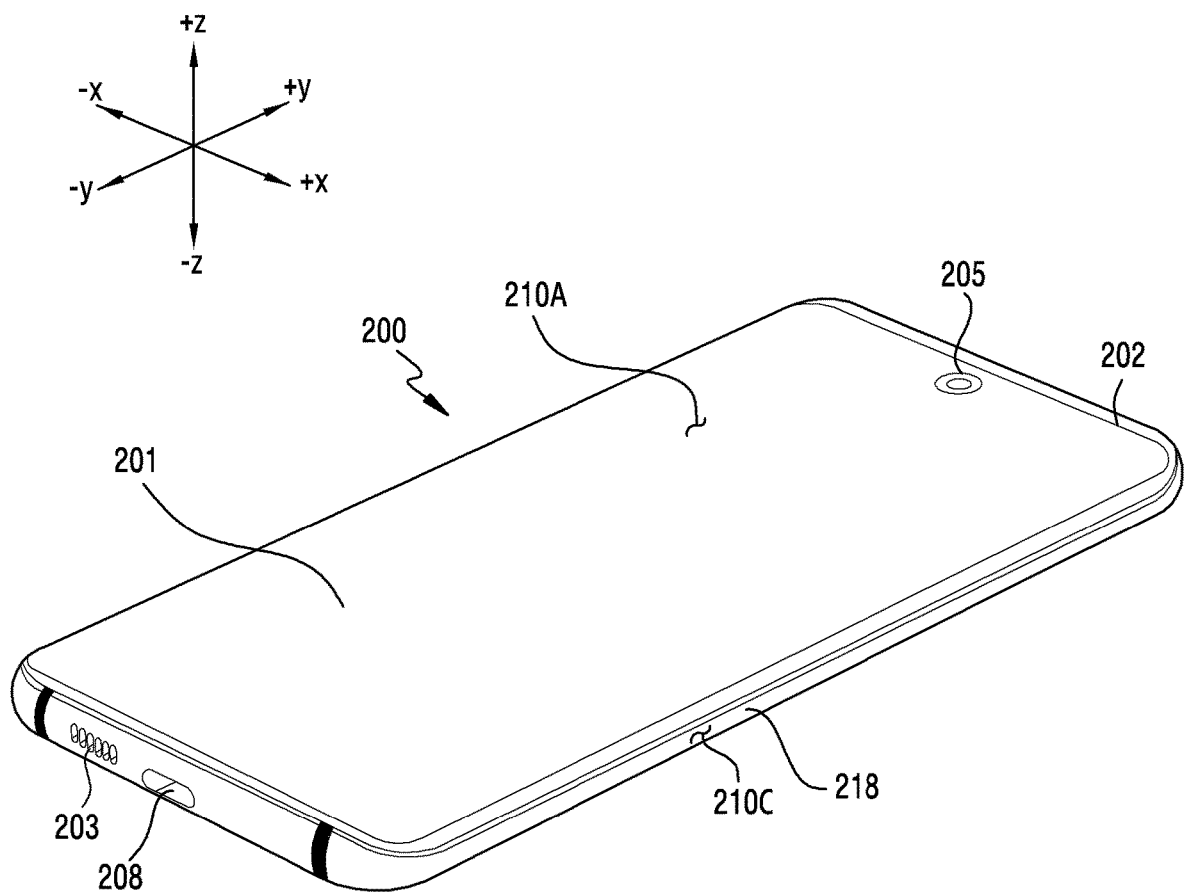
FIG. 2A is a perspective view illustrating a front surface of an electronic device according to an embodiment of the disclosure.
Figure 2B:
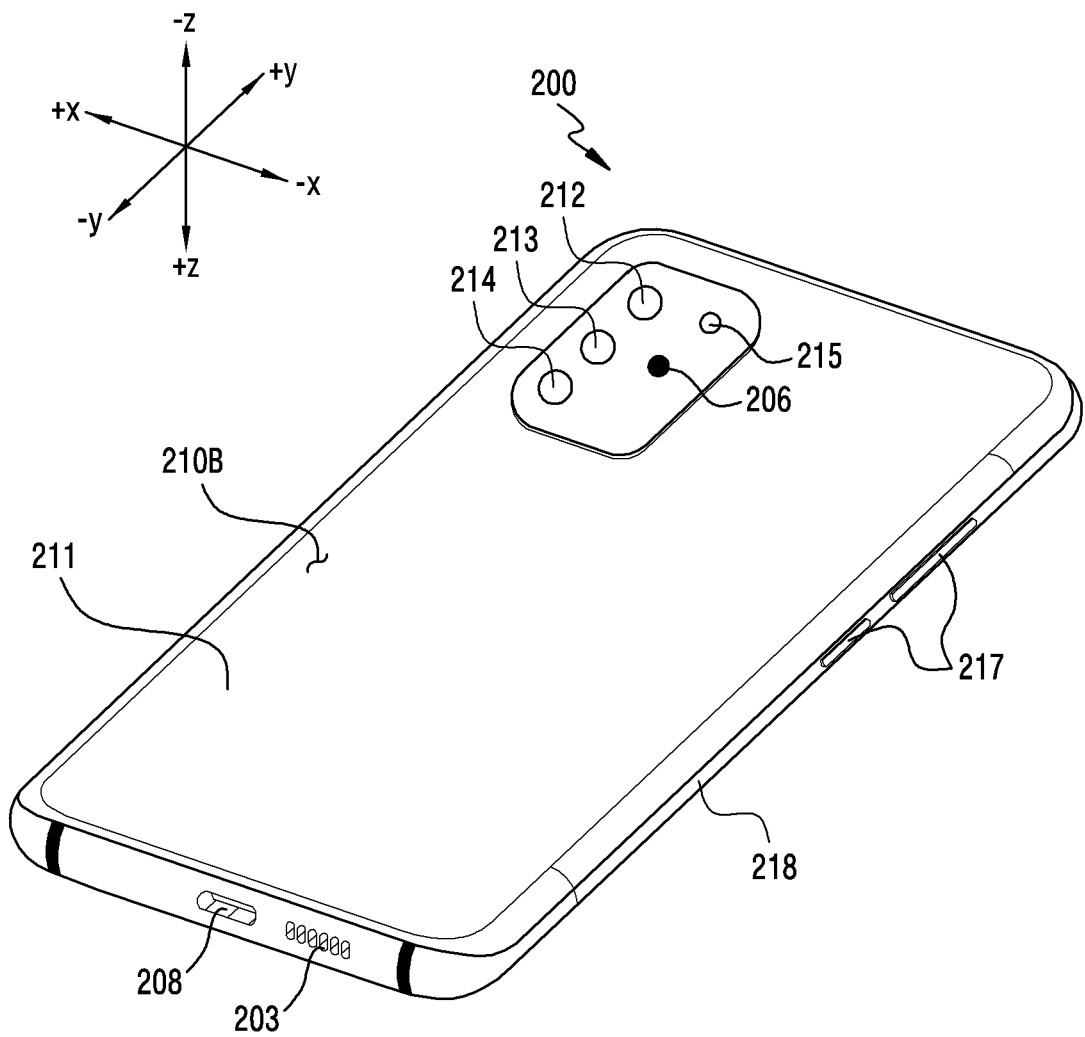
FIG. 2B is a perspective view illustrating a rear surface of the electronic device of FIG. 2A according to an embodiment of the disclosure.

FIG. 2A is a perspective view illustrating a front surface of an electronic device according to an embodiment of the disclosure, and FIG. 2B is a perspective view illustrating a rear surface of the electronic device of FIG. 2A according to an embodiment of the disclosure.

Referring to FIGS. 2A and 2B, the electronic device 200 (for example, the electronic device 101 of FIG. 1) according to an embodiment of the disclosure may include a housing 210 including a first surface (or a "front surface") 210A, a second surface (or a "rear surface") 210B, and a side surface (or a "sidewall") 210C enclosing a space between the first surface 210A and the second surface 210B. In another embodiment (not shown) of the disclosure, the housing 210 may refer to a structure that forms a portion of the first surface 210A, the second surface 210B and the side surface 210C of FIGS. 2A and 2B.

According to an embodiment of the disclosure, the first surface 210A may be formed by a front surface plate 202 (for example, a glass plate including various coating layers, or a polymer plate) having at least a portion substantially transparent. According to an embodiment of the disclosure, the front surface plate 202 may include a curved portion that is bent from the first surface 210A toward a rear surface plate 211 on at least a side edge portion and is seamlessly extended.

According to an embodiment of the disclosure, the second surface 210B may be formed by the rear surface plate 211 which is substantially opaque. The rear surface plate 211 may be formed by, for example, coated or colored glass, ceramic, a polymer, metal (for example, aluminum, stainless steel (STS), or magnesium), or a combination of at least two of the above-mentioned materials. According to an embodiment of the disclosure, the rear surface plate 211 may include a curved portion that is bent from the second surface 210B toward the front surface plate 202 on at least a side edge portion and is seamlessly extended.

According to an embodiment of the disclosure, the side surface 210C may be formed by a side surface member (or a "bracket") 218 which is coupled with the front surface plate 202 and the rear surface plate 211, and includes metal and/or a polymer. In a certain embodiment of the disclosure, the rear surface plate 211 and the side surface member 218 may be integrally formed with each other, and may include the same material (for example, a metallic material, such as aluminum).

According to an embodiment of the disclosure, the electronic device 200 may include at least one of a display 201, an audio module 203, a sensor module (not shown), a camera module 205, 212, 213, 206, a key input device 217, and a connector hole 208. In a certain embodiment of the disclosure, the electronic device 200 may omit at least one (for example, the key input device 217) of the components or may additionally include other components. In an example, the electronic device 200 may include a sensor module which is not illustrated. For example, the sensor module may be disposed on a back surface of a screen display area of the display 201 which is seen from the outside of the electronic device 200 through the front surface plate 202. For example, at least one of an optical sensor, an ultrasonic sensor, or a capacitive sensor may be disposed on the back surface of the screen display area of the display 201, but this should not be considered as limiting. In a certain embodiment of the disclosure, the electronic device 200 may further include a light emitting element, and the light emitting element may be disposed on a position adjacent to the display 101 within an area provided by the front surface plate 202. The light emitting element may provide state information of the electronic device 200 in the form of light. In another embodiment of the disclosure, the light emitting element may provide a light source which operates in association with the operation of the camera module 205. The light emitting element may include, for example, a light emitting diode (LED), an infrared LED (IR LED), and a xenon lamp.

The display 201 may be seen from the outside of the electronic device 200 through a substantial portion of the front surface plate 202, for example. In a certain embodiment of the disclosure, an edge of the display 201 may be formed substantially the same as a shape of a border (for example, a curved surface) of the front surface plate 202 that is adjacent to the display. In another embodiment (not shown) of the disclosure, a gap between the border of the display 201 and the border of the front surface plate 202 may be formed substantially the same to extend an exposed area of the display 201.

In another embodiment (not shown) of the disclosure, a recess, a notch, or an opening may be formed on a portion of the screen display area of the display 201, and the electronic device 200 may include other electronic components aligned with the recess, the notch, or the opening, for example, the camera module 205 or a sensor module (not shown). In another embodiment (not shown) of the disclosure, at least one of a camera module (for example, 212, 213, 214, 215), a fingerprint sensor, and a flash (for example, 206) may be included on the back surface of the screen display area of the display 201. In another embodiment (not shown) of the disclosure, the display 201 may be coupled with or disposed adjacent to a touch detection circuitry, a pressure sensor for measuring an intensity (pressure) of a touch, and/or a digitizer for detecting a stylus pen of a magnetic field method.

The audio module 203 may include a microphone hole and a speaker hole. The microphone hole may have a microphone disposed therein to acquire an external sound, and in a certain embodiment of the disclosure, the microphone hole may have a plurality of microphones disposed therein to detect a direction of a sound. In a certain embodiment of the disclosure, the speaker hole and the microphone hole may be implemented as one hole, or a speaker (for example, a piezo speaker) may be included without a speaker hole. The speaker hole may include an external speaker hole or a receiver hole for communication.

The electronic device 200 may include the sensor module which is not illustrated, thereby generating an electric signal or a data value corresponding to an internal operation state or an external environment state. The sensor module may further include a proximity sensor disposed on the first surface 210A of the housing 210, a fingerprint sensor disposed on the back surface of the display 201, and/or a biometric sensor (for example, a heart rate monitor (HRM) sensor) disposed on the second surface 210B of the housing 210. The electronic device 200 may further include a sensor module which is not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera module 205, 212, 213, 214, 215, 206 may include a first camera device 205 disposed on the first surface 210A of the electronic device 200, a second camera device 212, 213, 214, 215 disposed on the second surface 210B, and/or a flash 206. The camera devices 205, 212, 213, 214, 215 described above may include one lens or a plurality of lenses, an image sensor, and/or an image signal processor. The flash 206 may include, for example, a light emitting diode or a xenon lamp. In a certain embodiment of the disclosure, two or more lenses (an infrared camera, a wide angle lens and a telephoto lens) and image sensors may be disposed on one surface of the electronic device 200.

The key input device 217 may be disposed on the side surface 210C of the housing 210. In another embodiment of the disclosure, the electronic device 200 may not include a portion or an entirety of the above-mentioned key input device 217, and the key input device 217 that is not included may be implemented on the display 201 in other forms, such as a soft key. In a certain embodiment of the disclosure, the key input device may include at least a portion of the fingerprint sensor disposed on the second surface 210B of the housing 210.

The connector hole 208 may accommodate a connector for transmitting and receiving power and/or data to and from an external electronic device, and/or a connector for transmitting and receiving an audio signal to and from an external electronic device. For example, the connector hole 208 may include a USB connector or an earphone jack. In an embodiment of the disclosure, the USB connector and the earphone jack may be implemented by one hole (for example, 208 of FIGS. 2A and 2B), and according to an embodiment (not shown) of the disclosure, the electronic device 200 may transmit and receive power and/or data to and from an external electronic device (for example, the external electronic device 102, 104 of FIG. 1), or may transmit and receive an audio signal without a separate connector hole.

Figure 3:
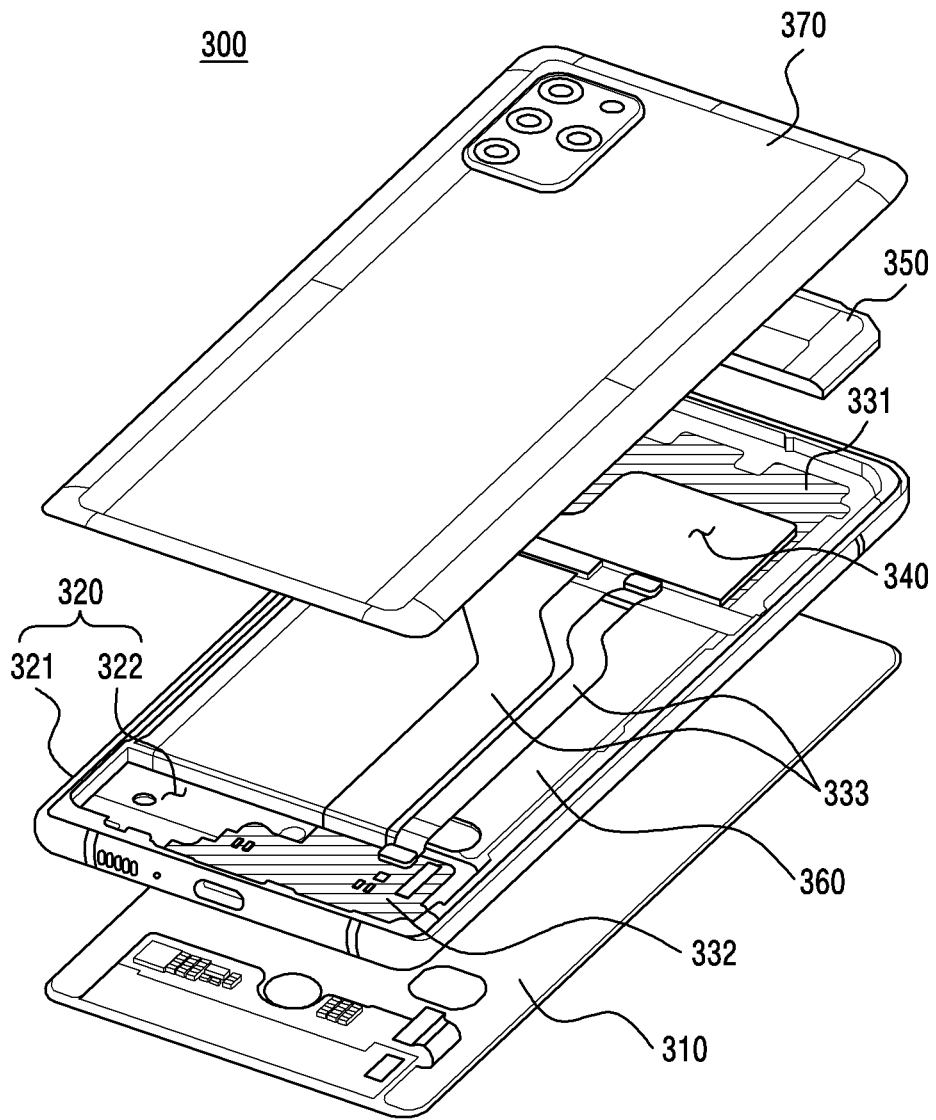
FIG. 3 is an exploded perspective view of an electronic device according to an embodiment of the disclosure.
Figure 3:
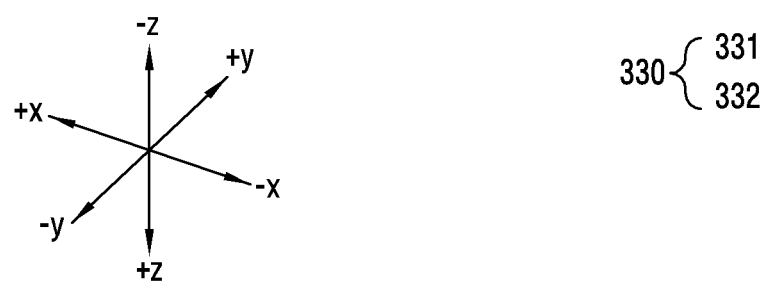

FIG. 3 is an exploded perspective view of an electronic device according to an embodiment of the disclosure.

Referring to FIG. 3, the electronic device 300 (for example, the electronic device 200 of FIGS. 2A and 2B) according to an embodiment may include a front surface plate (not shown) (for example, the front surface plate 202 of FIG. 2A), a display 310 (for example, the display 201 of FIG. 2A), a side surface member 320 (for example, the side surface member 218 of FIGS. 2A and 2B), at least one printed circuit board 330, a first support structure 340 (or a "shield can"), a second support structure 350, a battery 360, and/or a rear surface plate 370. At least one of the components of the electronic device 300 according to an embodiment may be the same as or similar to at least one of the components of the electronic device 101 of FIG. 1 and/or the electronic device 200 of FIGS. 2A and 2B, and a redundant explanation thereof is omitted.

According to an embodiment of the disclosure, the side surface member 320 may include a metal frame structure 321 and/or a support member 322.

In an example, the metal frame structure 321 may be formed with a conductive material (for example, metal) to form a side surface (for example, the side surface 210C of FIG. 2A) of the electronic device 300. For example, the metal frame structure 321 may include at least one conductive portion and/or at least one nonconductive portion for insulating the at least one conductive portion. The at least one conductive portion of the above-described metal frame structure 321 may operate as an antenna radiator to transmit and/or receive an RF signal of a designated frequency band.

In an embodiment of the disclosure, the support member 322 may be formed with a metallic material and/or a nonmetal material (for example, a polymer) to provide a space to have electronic components disposed in the electronic device 300. For example, the display 310 may be disposed on one surface (for example, one surface in the +z direction of FIG. 3) of the support member 322, and the at least one printed circuit board 330 may be disposed on the other surface (for example, one surface in the −z direction of FIG. 3) of the support member 322. According to an embodiment of the disclosure, the support member 322 may be connected with the metal frame structure 321 or may be integrally formed with the metal frame structure 321.

According to an embodiment of the disclosure, a plurality of electronic components may be disposed on the at least one printed circuit board 330. In an example, a processor (for example, the processor 120 of FIG. 1), a memory (for example, the memory 130 of FIG. 1), and/or an interface (for example, the interface 177 of FIG. 1) may be disposed on the at least one printed circuit board 330. The processor may include, for example, one or more of a central processing device, an application processor, a graphic processing device, an image signal processor, a sensor hub processor, or a communication processor. The memory may include, for example, a volatile memory or a nonvolatile memory. The interface may include, for example, a high definition multimedia interface (HDMI), a universal serial bus (USB) interface, a secure digital (SD) card interface, and/or an audio interface. The interface may electrically or physically connect the electronic device 200 with an external electronic device, and may include a USB connector, an SD card/multimedia card (MMC) connector, or an audio connector.

According to an embodiment of the disclosure, the at least one printed circuit board 330 may include a first printed circuit board 331 and/or a second printed circuit board 332. In an example, the first printed circuit board 331 may be disposed on one area (for example, a +y direction area of FIG. 3) of the support member 322. In another example, the second printed circuit board 332 may be disposed on another area (for example, a −y direction area of FIG. 3) of the support member 322 that is spaced apart from the first printed circuit board 331. In an example, the first printed circuit board 331 and the second printed circuit board 332 may be electrically connected with each other through an electric connection member 333. The above-described electric connection member 333 may include, for example, at least one of a flexible printed circuit board (FPCB), a coaxial cable, a board to board (B to B) connector, but is not limited thereto. The structure of the at least one printed circuit board 330 is not limited to the embodiment illustrated on the drawing, and according to another embodiment (not shown) of the disclosure, the at least one printed circuit board 330 may be configured as one printed circuit board.

According to an embodiment of the disclosure, the first support structure 340 (or the "shield can") may be formed with a conductive material (for example, metal) and may be disposed on the at least one printed circuit board 330. In an example, a patch antenna (not shown) may be disposed on at least one area (for example, one area in the −z direction of FIG. 3) of the first support structure 340, and the first support structure 340 may support the above-described patch antenna. The above-described patch antenna may operate, for example, as an antenna radiator to transmit and/or receive an RF signal of a UWB. In another example, the first support structure 340 may shield a plurality of electronic components disposed on the at least one printed circuit board 330. For example, the first support structure 340 may be disposed to enclose the plurality of electronic components and to block a noise generated in the plurality of electronic components.

According to an embodiment of the disclosure, the second support structure 350 (or a "rear case") may be formed with a material different from that of the first support structure 340. For example, the second support structure 350 may be formed with a nonconductive material (for example, plastic), but is not limited thereto. In an example, the second support structure 350 may be disposed on one area of the at least one printed circuit board 330 to prevent at least one area of the at least one printed circuit board 330 and/or a plurality of electronic components disposed on the at least one printed circuit board 330 from being damaged by an external shock. In an example, the second support structure 350 may be disposed not to overlap the first support structure 340 when viewed from an upper end (for example, the −z direction of FIG. 3) of the at least one printed circuit board 330. According to another embodiment of the disclosure, the second support structure 350 may be disposed to overlap a portion of the first support structure 340. In an example, at least one conductive pattern may be disposed on at least a certain area of the second support structure 350. The above-described at least one conductive pattern may operate as an antenna radiator to transmit and/or receive an RF signal of a UWB, along with the patch antenna disposed on the first support structure 340.

According to an embodiment of the disclosure, the battery 360 is a device for supplying power to at least one component of the electronic device 300, and for example, may include a primary battery which is not rechargeable, or a rechargeable secondary battery, or a fuel cell. At least a portion of the battery 360 may be disposed on substantially the same plane as the at least one printed circuit board 330. According to an embodiment of the disclosure, the battery 360 may be integrally disposed in the electronic device 300, and may be attachably and detachably disposed in the electronic device 300.

According to an embodiment of the disclosure, the rear surface plate 370 may form a rear surface (for example, the second surface 210B of FIG. 2B) of the electronic device 300. The rear surface plate 370 may protect inner components of the electronic device 300 from an external shock or inflow of foreign substances.

Figure 4:
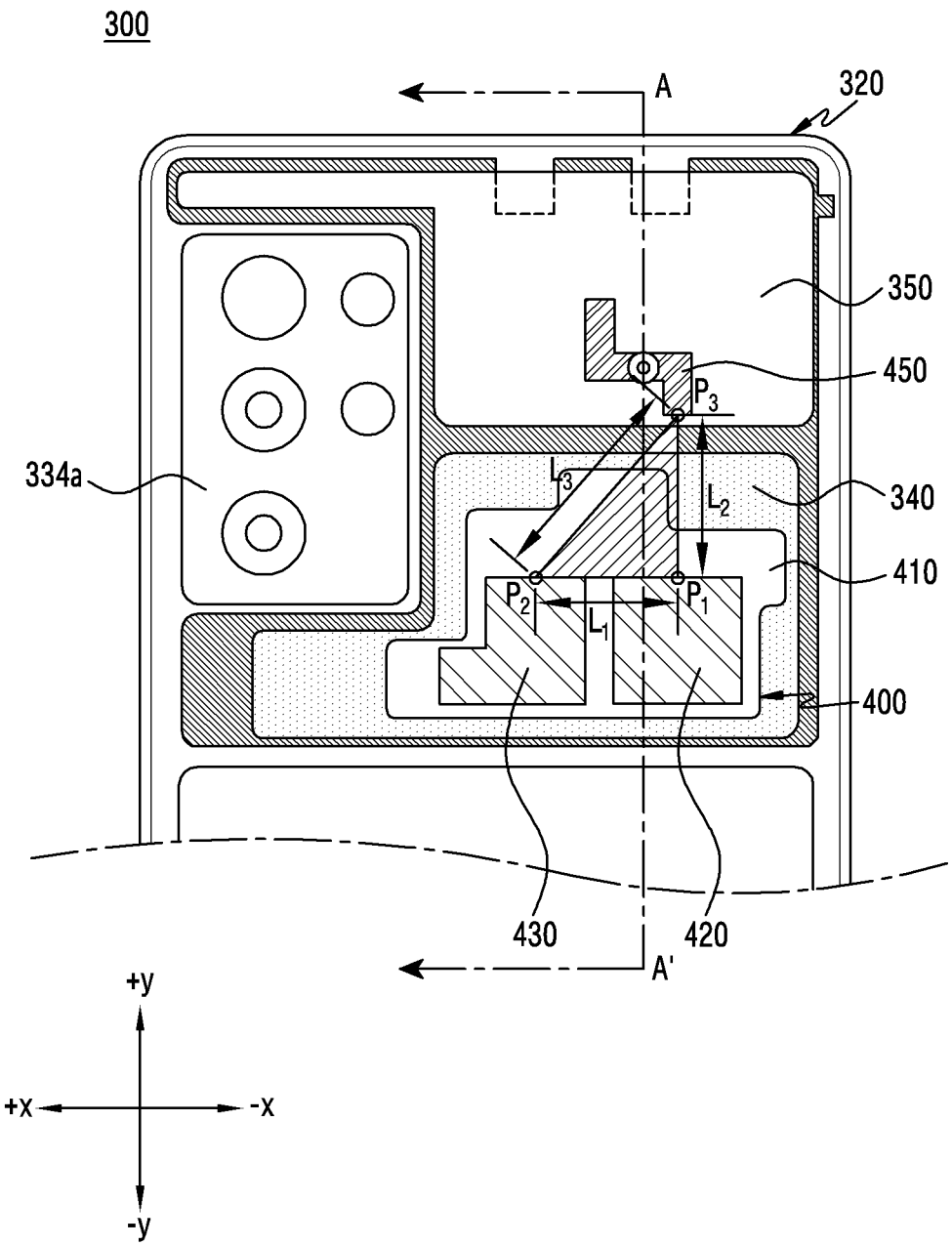
FIG. 4 is a view illustrating a first support structure, a second support structure, and an antenna radiator disposed on the first support structure and the second support structure in an electronic device according to an embodiment of the disclosure.
Figure 5:
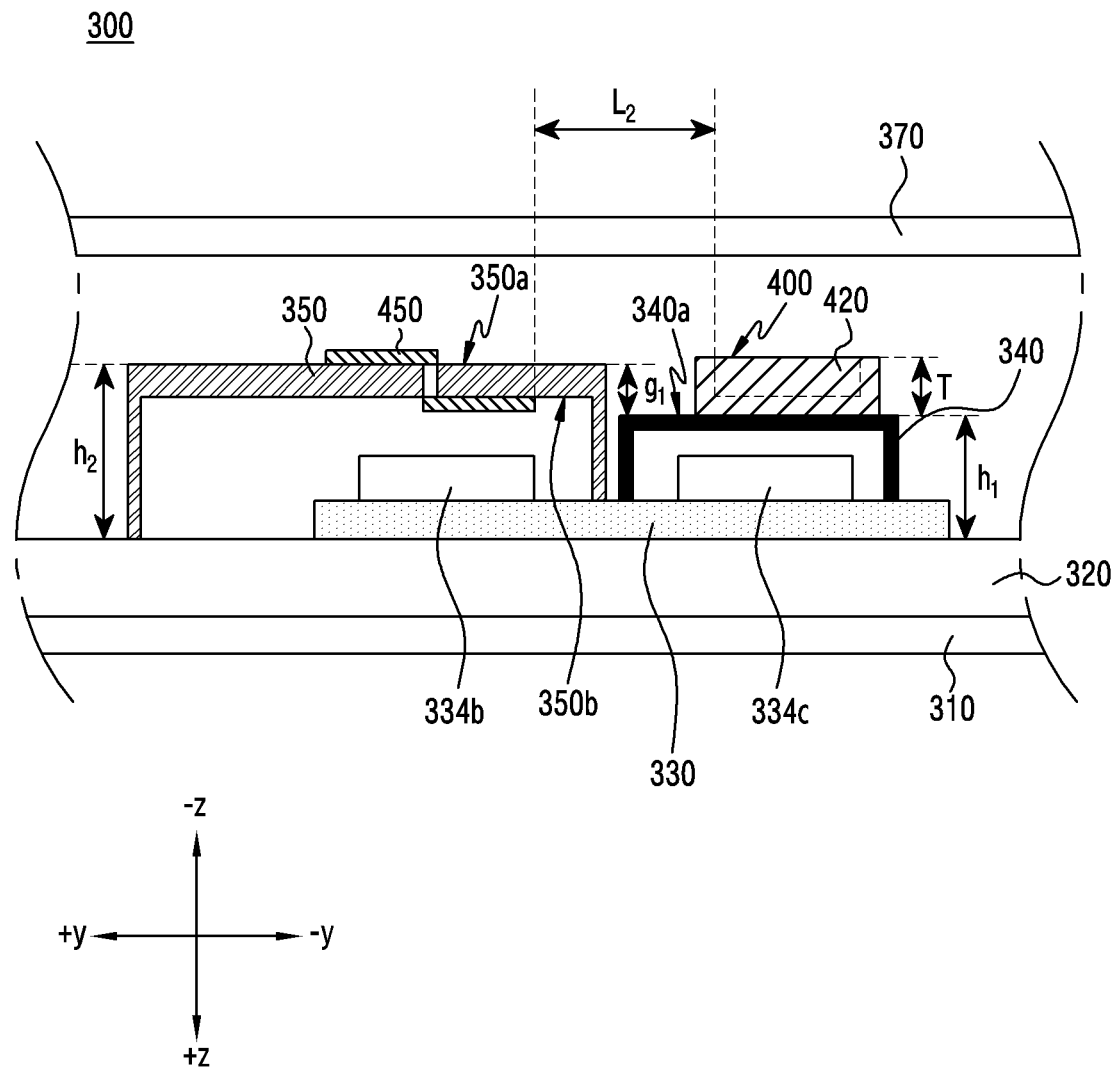
FIG. 5 is a cross-sectional view of an electronic device of FIG. 4, taken on line A-A', according to an embodiment of the disclosure.

FIG. 4 is a view illustrating a first support structure, a second support structure, and an antenna radiator disposed on the first support structure and the second support structure according to an embodiment of the disclosure, and FIG. 5 is a cross-sectional view of an electronic device of FIG. 4, taken on line A-A', according to an embodiment of the disclosure.

FIG. 4 is a front view of the side surface member (for example, the side surface member 320 of FIG. 3) of the electronic device of FIG. 3 when viewed from one direction (for example, the −z direction of FIG. 3).

Referring to FIGS. 4 and 5, the electronic device 300 according to an embodiment of the disclosure may include a display 310 (for example, the display 310 of FIG. 3), the side surface member 320 (for example, the side surface member 320 of FIG. 3), the at least one printed circuit board 330 (for example, the first printed circuit board 331 of FIG. 3), at least one electronic component 334a, 334b, 334c, a first support structure 340 (for example, the first support structure 340 of FIG. 3), a second support structure 350 (for example, the second support structure 350 of FIG. 3), a rear surface plate 370 (for example, the rear surface plate 370 of FIG. 3), a patch antenna 400 and/or a conductive pattern 450. At least one of the components of the electronic device 300 according to an embodiment of the disclosure may be the same as or similar to at least one of the components of the electronic device 300 of FIG. 3, and a redundant explanation thereof is omitted.

According to an embodiment of the disclosure, the side surface member 320 may provide a space to have the components of the electronic device 300 disposed therein. In an example, the at least one printed circuit board 330 may be disposed on one surface (for example, one surface in the −z direction of FIG. 5) of the side surface member 320, and the display 310 may be disposed on the other surface (for example, one surface in the +z direction of FIG. 5) of the side surface member 320.

According to an embodiment of the disclosure, at least one electronic components 334a, 334b, 334c may be disposed on at least one area of the at least one printed circuit board 330. In an example, the at least one electronic component 334a may include a camera module (for example, the camera module 180 of FIG. 1), a processor (not shown) (for example, the processor 120 of FIG. 1), a signal wire 334b, 334c, and/or a wireless communication circuit (not shown) (for example, the wireless communication module 192 of FIG. 1), but is not limited thereto.

According to an embodiment of the disclosure, the first support structure 340 may be formed with a conductive material (for example, metal) and may be disposed on at least one area of the at least one printed circuit board 330. In an example, the patch antenna 400 may be disposed on one surface 340a (for example, one surface in the −z direction of FIG. 5) of the first support structure 340 that faces the rear surface plate 370, and the first support structure 340 may support the above-described patch antenna 400. In another example, the first support structure 340 may operate as a shield can to shield at least one electronic component (for example, the signal wire 334b, 334c) disposed on the at least one printed circuit board 330. For example, the first support structure 340 may block a noise generated in the at least one electronic component 334b, 334c (for example, the processor, and/or the wireless communication circuit). In an example, one surface of the first support structure 340 on which the patch antenna 400 is disposed may have at least one area formed in a flat structure, but is not limited thereto.

According to an embodiment of the disclosure, the second support structure 350 may be formed with a nonconductive material (for example, plastic or polymer) different from the first support structure 340, and may be positioned between the side surface member 320 and the rear surface plate 370. In an example, the conductive pattern 450 may be disposed on one surface 350a (for example, one surface in the −z direction of FIG. 5) of the second support structure 350 that faces the rear surface plate 370, and the second support structure 350 may support the above-described conductive pattern 450. In another example, the second support structure 350 may be disposed on at least one area of the side surface member 320 and/or at least one area of the at least one printed circuit board 330 to prevent some areas of the side surface member 320 and/or the at least one printed circuit board 330 from being damaged by an external shock. In an example, the second support structure 350 may be disposed not to overlap the first support structure 340 when the side surface member 320 is viewed from the rear surface plate 370. However, the arrangement structure of the first support structure 340 and the second support structure 350 are not limited to the above-described embodiment of the disclosure, and according to another embodiment (not shown) of the disclosure, the second support structure 350 may be disposed to overlap some areas of the first support structure 340.

According to an embodiment of the disclosure, the patch antenna 400 may be disposed on one surface 340a (for example, one surface in the −z direction of FIG. 5) of the first support structure 340 that faces the rear surface plate 370. In an example, the patch antenna 400 may include a flexible printed circuit board (or an FPCB) 410, a first conductive patch 420 (or a "first patch element"), a second conductive patch 430 (or a "second patch element"). In an example, the flexible printed circuit board 410 may be formed of a plurality of layers, and may include a ground to ground the first conductive patch 420 and/or the second conductive patch 430. In another example, a dielectric (not shown) may be disposed between a layer on which the first conductive patch 420 and/or the second conductive patch 430 is disposed, and a layer including the ground.

In an example, the first conductive patch 420 and the second conductive patch 430 may be disposed on one surface (for example, one surface in the −z direction of FIG. 5) of the flexible printed circuit board 410 that faces the rear surface plate 370. In another example, the first conductive patch 420 and the second conductive patch 430 may be positioned on the same plane and may be disposed to be spaced apart from each other by a designated distance. In an example, the first conductive patch 420 and/or the second conductive patch 430 of the patch antenna 400 may be electrically connected with the wireless communication circuit disposed on the at least one printed circuit board 330 through a signal wire (not shown). Through the above-described electric connection relationship, the wireless communication circuit may transmit or feed an RF signal of a designated frequency band to the first conductive patch 420 and/or the second conductive patch 430. In an example, the first conductive patch 420 may be fed from the wireless communication circuit at a first point $P_1$, and the second conductive patch 430 may be fed from the wireless communication circuit at a second point $P_2$, which is spaced apart from the first point $P_1$ by a designated distance. The first conductive patch 420 and/or the second conductive patch 430 may be fed from the wireless communication circuit, such that the first conductive patch 420 and/or the second conductive patch 430 operates as an antenna radiator to transmit and/or receive an RF signal of a designated frequency band. In an example, the first conductive patch 420 and/or the second conductive patch 430 may operate as a radiator to transmit and/or receive an RF signal of a UWB frequency band. For example, the UWB frequency band may be a frequency band of about 6.25 gigahertz (GHz) to about 8.75 GHz, but is not limited thereto.

In an example, as a thickness T of the patch antenna 400 is thicker, antenna performance (for example, radiation performance) of the first conductive patch 420 and/or the second conductive patch 430 of the patch antenna 400 may be more enhanced. For example, as a thickness of the dielectric of the patch antenna 400 is thicker, a coupling space between the first conductive patch 420 and/or the second conductive patch 430 of the patch antenna 400, and the ground of the flexible printed circuit board 410 may increase. As the coupling space between the first conductive patch 420 and/or the second conductive patch 430, and the ground of the flexible printed circuit board 410 increases, antenna efficiency (or "antenna gain") of the first conductive patch 420 and/or the second conductive patch 430 may increase, and as a result, antenna radiation performance of the first conductive patch 420 and/or the second conductive patch 430 may be enhanced. According to an embodiment of the disclosure, the electronic device 300 may form a space on the first support structure 340 to have the patch antenna 400 of the predetermined thickness T or thicker disposed thereon, by forming a difference between the height of the first support structure 340 on which the patch antenna 400 is disposed and the height of the second support structure 350 on which the conductive pattern 450 is disposed.

In an example, the one surface 340a of the first support structure 340 that faces the rear surface plate 370 may be formed on a position having a first height $h_1$ from the side surface member 320. In another example, the one surface 350a of the second support structure 350 that faces the rear surface plate 370 may be formed on a position having a second height $h_2$ higher than the first height $h_1$ from the side surface member 320. The one surface 340a of the first support structure 340 that faces the rear surface plate 370 is positioned lower than the one surface 350a of the second support structure 350 that faces the rear surface plate 370, such that a multi-stage structure is formed between the first support structure 340 and the second support structure 350 when viewed from the side surface of the electronic device 300. Through the above-described structure, the patch antenna 400 having the same thickness T as a gap $g_1$ formed between the first support structure 340 and the second support structure 350 may be disposed on the one surface 350a of the first support structure 340 that faces the rear surface plate 370. For example, the gap $g_1$ formed between the first support structure 340 and the second support structure 350 may be about 0.25 mm, and the patch antenna 400 having the thickness T of about 0.25 mm may be disposed on the one surface 350a of the first support structure 340. However, a length of the gap $g_1$ formed between the first support structure 340 and the second support structure 350, and/or the thickness T of the patch antenna 400 are not limited to the above-described embodiment.

According to an embodiment of the disclosure, the conductive pattern 450 may be disposed on the second support structure 350 formed with a material (for example, a non-conductive material) different from the first support structure 340. In an example, the conductive pattern 450 may be disposed on the one surface 350a (for example, one surface in the −z direction of FIG. 5) of the second support structure 350 that faces the rear surface plate 370. In another example, the conductive pattern 450 may be disposed on the other surface 350b facing in the opposite direction of the one surface 350a of the second support structure 350 that faces the rear surface plate 370. In another example, the conductive pattern 450 may be disposed on both the one surface 350a of the second support structure 350 described above and the other surface 350b. For example, the conductive pattern 450 may be formed by drawing a pattern on at least one area of the second support structure 350 through lasers and then patterning a conductive material (for example, metal), but this should not be considered as limiting. In an example, the conductive pattern 450 may be electrically connected with the wireless communication circuit of the at least one printed circuit board 330 through an electric connection member (not shown) (for example, a signal wire, a coaxial cable, an FPCB, a C-clip, a conductive gasket, or a conductive foam). Through the above-described electric connection relationship, the wireless communication circuit may transmit or feed an RF signal of a designated frequency band to the conductive pattern 450. In an example, the conductive pattern 450 may be fed from the wireless communication circuit at a third point $P_3$, and accordingly, the conductive pattern 450 may operate as an antenna radiator (for example, a laser direct structuring (LDS) antenna). For example, the conductive pattern 450 may operate as an antenna radiator to transmit and/or receive an RF signal of a UWB frequency band substantially the same as or similarly to the first conductive patch 420 and/or the second conductive patch 430. In an example, the conductive pattern 450 may be formed to have an electric length of "λ/4" of the above-described RF signal. For example, the conductive pattern 450 may be formed to have a length of about 9 to 11 mm which is an electric length of λ/4 of an RF signal of a frequency band of about 8 GHz, but is not limited thereto. For example, the electronic device 300 according to an embodiment may transmit and/or receive an RF signal of a UWB frequency band through the first conductive patch 420, the second conductive patch 430 disposed on the first support structure 340, and the conductive pattern 450 disposed on the second support structure 350, which is different from the first support structure 340.

As the first conductive patch 420 and the second conductive patch 430 disposed on the first support structure 340, and the conductive pattern 450 disposed on the second support structure 350 operate as antenna radiators to transmit and/or receive the RF signal of substantially the same or similar frequency band, there may be interference between the first conductive patch 420, the second conductive patch 430, and/or the conductive pattern 450. In an example, the electronic device 300 may reduce the interference which may occur between the first conductive patch 420, the second conductive patch 430, and/or the first conductive patch 420 by adjusting distances between the first conductive patch 420, the second conductive patch 430, and/or the conductive pattern 450 which operates as an antenna radiator. In an example, the first conductive patch 420 may be disposed to be spaced apart from the second conductive patch 430 by a designated distance. In another example, the first conductive patch 420 may be disposed to be spaced apart from the conductive pattern 450 by a designated distance, and the second conductive patch 430 may be disposed to be spaced apart from the conductive pattern 450 by a designated distance. For example, the electronic device 300 according to an embodiment can guarantee isolation (or separation) between the first conductive patch 420, the second conductive patch 430, and/or the conductive pattern 450 by spacing the first conductive patch 420, the second conductive patch 430, and/or the conductive pattern 450 part from one another by designated distances.

According to an embodiment of the disclosure, the first conductive patch 420, the second conductive patch 430, and/or the conductive pattern 450 may be disposed to be spaced apart from one another by designated distances, and may be positioned within predetermined distances to operate as UWB antennas to detect a position of an external electronic device (for example, the external electronic device 102, 104 of FIG. 1). In an example, the first conductive patch 420 and the second conductive patch 430 may be disposed such that a distance $L_1$ between the first point $P_1$ at which the first conductive patch 420 is fed from the wireless communication circuit, and the second point $P_2$ at which the second conductive patch 430 is fed from the wireless communication circuit is less than or equal to a half wavelength ($\lambda/2$) distance of an RF signal transmitted and/or received through the first conductive patch 420 and/or the second conductive patch 430. In another example, the first conductive patch 420 and the conductive pattern 450 may be disposed such that a distance $L_2$ between the first point $P_1$ which is a feeding position of the first conductive patch 420, and the third point $P_3$ at which the conductive pattern 450 is fed from the wireless communication circuit is less than or equal to a half wavelength ($\lambda/2$) distance of an RF signal transmitted and/or received through the first conductive patch 420 and/or the conductive pattern 450. In another example, the second conductive patch 430 and the conductive pattern 450 may be disposed such that a distance $L_3$ between the second point $P_2$ which is a feeding position of the second conductive patch 430, and the third point $P_3$ which is a feeding position of the conductive pattern 450 is less than or equal to a half wavelength ($\lambda/2$) distance of an RF signal transmitted and/or received through the second conductive patch 430 and/or the conductive pattern 450. For example, the distance $L_1$ between the first point of the first conductive patch 420 and the second point $P_2$ of the second conductive patch 430, the distance $L_2$ between the first point $P_1$ of the first conductive patch 420 and the third point $P_3$ of the conductive pattern 450, and/or the distance $L_3$ between the second point $P_2$ of the second conductive patch 430 and the third point $P_3$ of the conductive pattern 450 may be about 10 mm to about 30 mm, but is not limited thereto. The electronic device 300 according to an embodiment may have the first conductive patch 420, the second conductive patch 430, and/or the conductive pattern 450 arranged to have distances between their feeding positions less than or equal to a half wavelength ($\lambda/2$) distance of an RF signal, such that the first conductive patch 420, the second conductive patch 430, and/or the conductive pattern 450 can be used as a UWB antenna to detect a position of an external electronic device (for example, the external electronic device 102, 104 of FIG. 1).

According to an embodiment of the disclosure, the electronic device 300 may use any one of the first conductive patch 420, the second conductive patch 430, and/or the conductive pattern 450, which operates as an antenna radiator, as an antenna radiator to transmit and receive an RF signal of a designated frequency band (for example, a UWB), and may use the other antenna radiator as an antenna radiator to receive an RF signal of a designated frequency band. In an example, the electronic device 300 may use an antenna radiator that has a smallest sum of distances between feeding points with respect to the other antenna radiators, from among the first conductive patch 420, the second conductive patch 430, and/or the conductive pattern 450 which operates as an antenna radiator, as an antenna radiator to transmit and receive an RF signal of a designated frequency band. For example, the sum $L_1+L_2$ of the distance $L_1$ between the first point $P_1$ of the first conductive patch 420 and the second point $P_2$ of the second conductive patch 430, and the distance $L_2$ between the first point $P_1$ and the third point $P_3$ of the conductive pattern 450 may be smaller than the sum $L_1+L_3$ of the distance $L_1$ between the first point $P_1$ and the second point $P_2$ and the distance $L_3$ between the second point $P_2$ and the third point $P_3$. In another example, the sum $L_1+L_2$ of the distance $L_1$ between the first point $P_1$ and the second point $P_2$ and the distance $L_2$ between the first point $P_1$ and the third point $P_3$ may be smaller than the sum $L_2+L_3$ of the distance $L_2$ between the first point $P_1$ and the third point $P_3$ and the distance $L_3$ between the second point $P_2$ and the third point $P_3$. In the above-described case, the electronic device 300 may use the first conductive patch 420 that has the smallest sum of distances between feeding positions with respect to the other antenna radiators, from among the first conductive patch 420, the second conductive patch 430, and/or the conductive pattern 450, as an antenna radiator to transmit and receive an RF signal of a designated frequency band. In another example, the electronic device 300 may use the second conductive patch 430 and/or the conductive pattern 450 as an antenna radiator to receive an RF signal of a designated frequency band.

In an example, the feeding positions of the first conductive patch 420, the second conductive patch 430, and/or the conductive pattern 450 may be formed on designated positions. For example, a virtual extension line between the first point $P_1$ which is a feeding position of the first conductive patch 420 and the second point $P_2$ which is a feeding position of the second conductive patch 430 may be formed to be perpendicular to a virtual extension line between the first point $P_1$ of the first conductive patch 420 and the third point $P_3$ which is a feeding position of the conductive pattern 450. Through the above-described arrangement structure, antenna performance (for example, radiation performance) of the first conductive patch 420, the second conductive patch 430, and/or the conductive pattern 450 can be enhanced. However, the feeding positions of the first conductive patch 420, the second conductive patch 430, and/or the conductive pattern 450 are not limited to the above-described embodiment. According to an embodiment (not shown) of the disclosure, the virtual extension line between the first point $P_1$ which is a feeding position of the first conductive patch 420 and the second point $P_2$ which is a feeding position of the second conductive patch 430 may be formed to form a designated angle (for example, 30°, 45°, or 60°) with the virtual extension line between the first point $P_1$ of the first conductive patch 420 and the third point $P_3$ which is a feeding position of the conductive pattern 450.

Figure 6A:
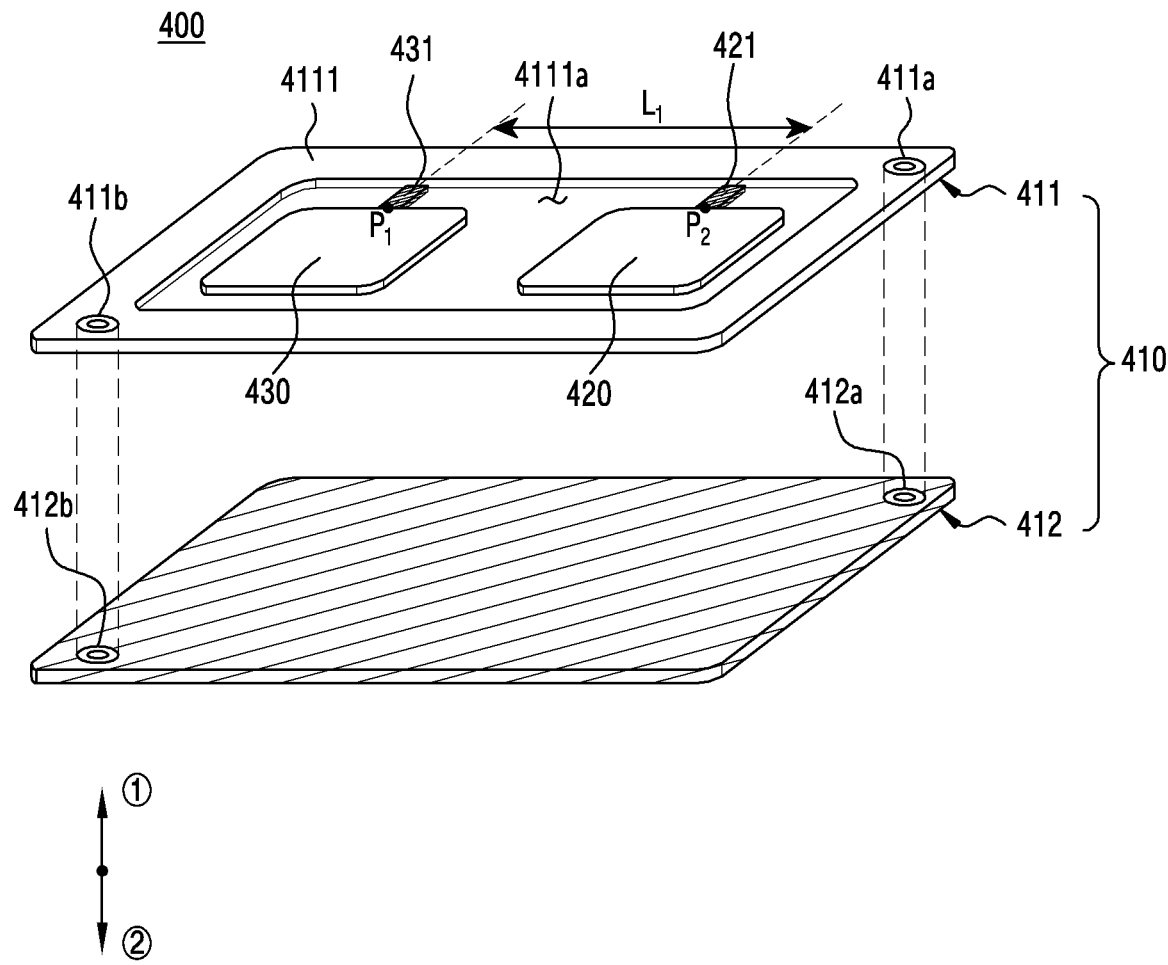
FIG. 6A is an exploded perspective view of a patch antenna of an electronic device according to an embodiment of the disclosure.
Figure 6B:
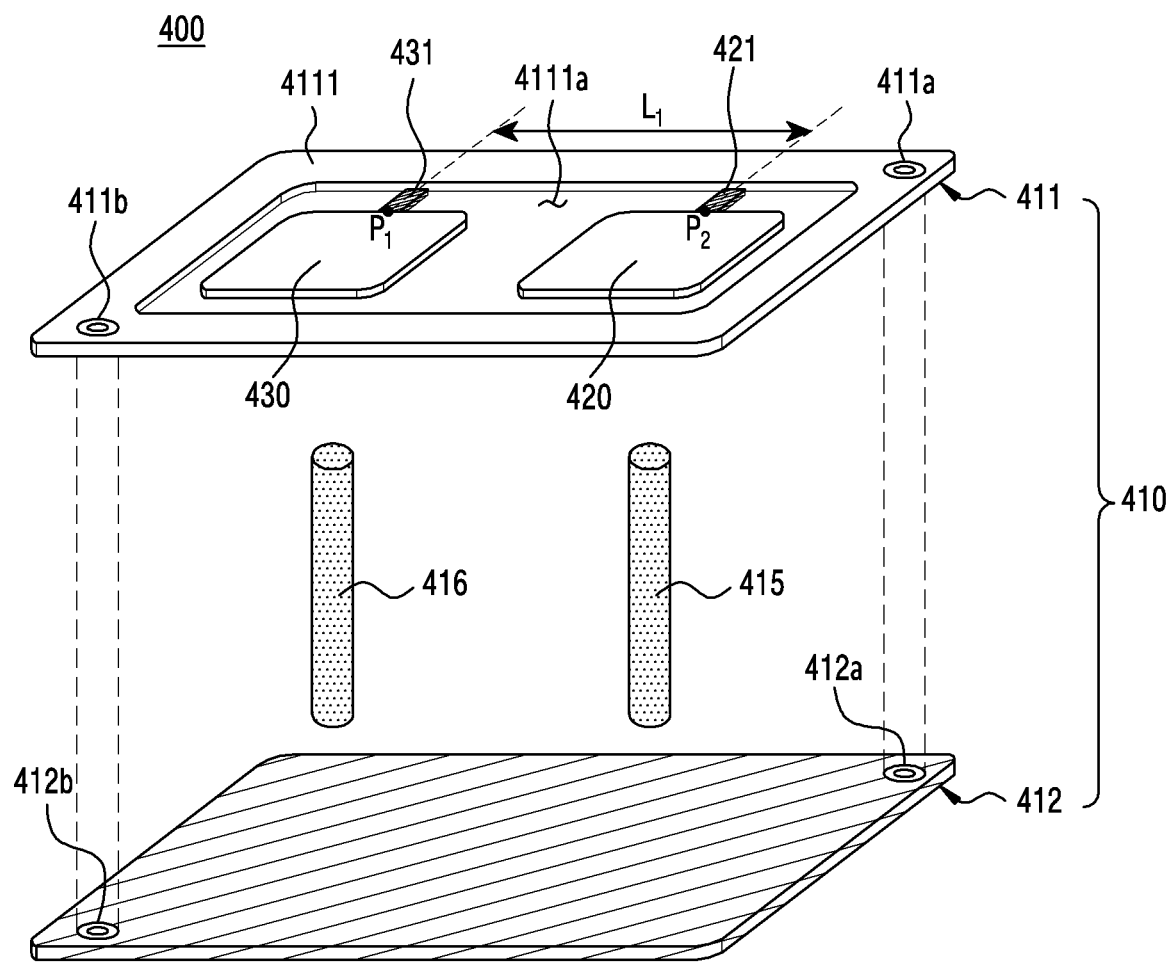
FIG. 6B is an exploded perspective view of a patch antenna of an electronic device according to an embodiment of the disclosure.
Figure 6C:
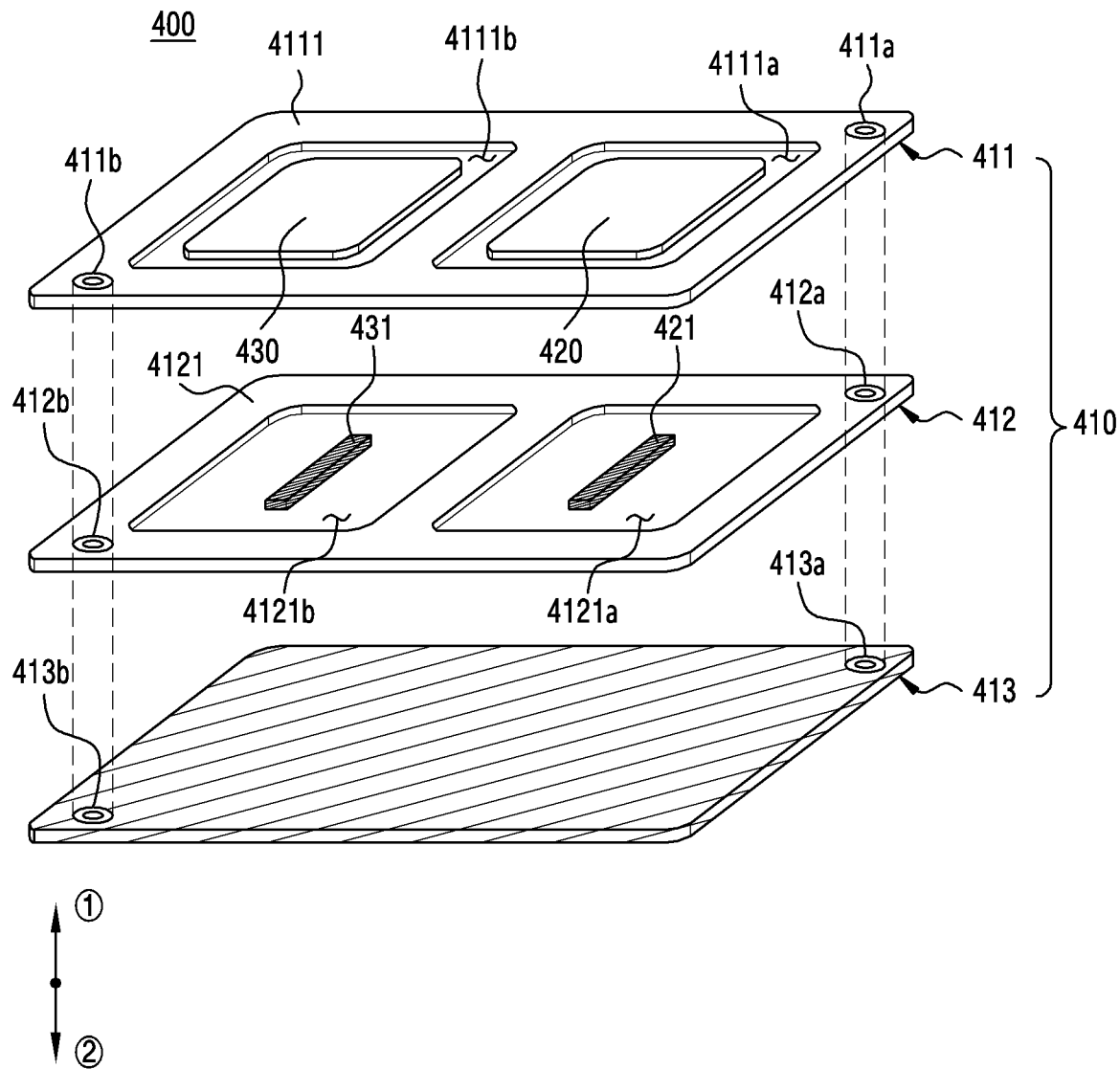
FIG. 6C is an exploded perspective view of a patch antenna of an electronic device according to an embodiment of the disclosure.

FIG. 6A is an exploded perspective view of a patch antenna of an electronic device according to an embodiment of the disclosure, FIG. 6B is an exploded perspective view of a patch antenna of an electronic device according to an embodiment of the disclosure, and FIG. 6C is an exploded perspective view of a patch antenna of an electronic device according to an embodiment of the disclosure.

FIGS. 6A, 6B, and/or 6C illustrate a configuration of the patch antenna 400 of the electronic device 300 of FIGS. 4 and 5.

Referring to FIGS. 6A, 6B, and 6C, the patch antenna 400 (for example, the patch antenna 400 of FIG. 4) of the electronic device (for example, the electronic device 300 of FIG. 5) according to an embodiment may include a flexible printed circuit board 410 (for example, the flexible printed circuit board 410 of FIG. 4), a first conductive patch 420 (for example, the first conductive patch 420 of FIG. 4), a second conductive patch 430 (for example, the second conductive patch 430 of FIG. 4), and/or at least one signal wire 421, 431.

Referring to FIG. 6A, the flexible printed circuit board 410 according to an embodiment may include a plurality of layers 411, 412. For example, the flexible printed circuit board 410 may include a first layer 411 and/or a second layer 412 which is positioned on a lower end (for example, the direction of FIG. 6A) of the first layer 411.

In an embodiment of the disclosure, the first conductive patch 420 and/or the second conductive patch 430 which is spaced apart from the first conductive patch 420 by a designated distance $L_1$ (for example, $L_1$ of FIG. 4) may be disposed on the first layer 411 of the flexible printed circuit board 410. In another example, the first conductive patch 420 and/or the second conductive patch 430 may be electrically connected with a wireless communication circuit (not shown) (for example, the wireless communication module 192 of FIG. 1) through the at least one signal wire 421, 431. For example, the first conductive patch 420 may be electrically connected with the wireless communication circuit through the first signal wire 421, and the second conductive patch 430 may be electrically connected with the wireless communication circuit through the second signal wire 431. Disposal positions of the first signal wire 421 and/or the second signal wire 431 are not limited to the illustrated embodiment of the disclosure, and according to an embodiment of the disclosure, the disposal positions of the first signal wire 421 and/or the second signal wire 431 may be changed.

Referring to FIG. 6B, in another example (for example, see FIG. 6B) according to another embodiment of the disclosure, electric connection members 415, 416 may be disposed between the first layer 411 and the second layer 412 of the flexible printed circuit board 410 to electrically connect the first conductive patch 420 and/or the second conductive patch 430 and a ground of the second layer 412.

In an example, the electric connection members 415, 416 may include a first electric connection member 415 to electrically connect the first conductive patch 420 of the first layer 411 and the ground of the second layer 412, and/or a second electric connection member 416 to electrically connect the second conductive patch 430 of the first layer 411 and the ground of the second layer 413. A current flow of a feeding current flowing from the wireless communication circuit (for example, the wireless communication module 192 of FIG. 1) to the first conductive patch 420 and/or the second conductive patch 430 may be changed through first electric connection member 415 and/or the second electric connection member 416, and as a result, resonance characteristics of the first conductive patch 420 and/or the second conductive patch 430 may be changed. In an example, the first electric connection member 415 and/or the second electric connection member 416 may refer to a structure in which a plurality of conductive vias are aligned in the form of a wall. In another example, the first electric connection member 415 and/or the second electric connection member 416 may be a conductive via in the form of a wall, but is not limited thereto. According to another embodiment (not shown) of the disclosure, the first electric connection member 415 and/or the second electric connection member 416 may be at least one of a signal wire, a conductive gasket, a C-clip, or a conductive foam.

In an example, a guard ground 4111 including at least one groove 4111a may be disposed on the first layer 411 of the flexible printed circuit board 410. In another example, the guard ground 4111 may be disposed to enclose the first conductive patch 420, the second conductive patch 430, and/or the at least one signal wire 421, 431 disposed on the first layer 411. For example, the first conductive patch 420, the second conductive patch 430, and/or the at least one signal wire 421, 431 are disposed within the at least one groove 4111a of the guard ground 4111, such that the guard ground 4111 is disposed to enclose the first conductive patch 420, the second conductive patch 430, and/or the at least one signal wire 421, 431. In an example, the guard ground 4111 may shield the first conductive patch 420, the second conductive patch 430, and/or the at least one signal wire 421, 431. For example, the guard ground 4111 may shield the first conductive patch 420, the second conductive patch 430, and/or the at least one signal wire 421, 431 from a noise generated in the other electronic components in the electronic device 300.

In an example, the second layer 412 (or a "ground layer") of the flexible printed circuit board 410 may include a ground. In another example, coupling (or "capacitive coupling") may be generated between the ground of the second layer 412 and the at least one signal wire 421, 431 of the first layer 411. In an example, a dielectric (not shown) having a designated dielectric constant may be filled between the first layer 411 and the second layer 412 of the flexible printed circuit board 410. The resonance characteristics of the first conductive patch 420 and/or the second conductive patch which operates as an antenna radiator may be changed according to a thickness of the dielectric disposed between the first layer 411 and the second layer 412. For example, as the thickness of the dielectric disposed between the first layer 411 and the second layer 412 increases, a coupling space between the first conductive patch 420 and/or the second conductive patch 430, and the ground of the second layer 412 may increase, and accordingly, antenna efficiency (or "antenna gain") of the first conductive patch 420 and/or the second conductive patch 430 can be enhanced.

In an example, the first layer 411 and the second layer 412 of the flexible printed circuit board 410 may be electrically connected with each other through at least one via (not shown) penetrating through the guard ground 4111 and including a conductive material. In an example, at least one first penetrating hole (or a "via hole") 411*a*, 411*b* may be formed on the guard ground 4111 of the first layer 411, and at least one second penetrating hole 412*a*, 412*b* may be formed on a position of the second layer 412 corresponding to the at least one first penetrating hole 411*a*, 411*b* of the first layer 411. The at least one via may be disposed within the at least one first penetrating hole 411*a*, 411*b* of the first layer 411 and the at least one second penetrating hole 412*a*, 412*b* of the second layer 412, thereby electrically connecting the first layer 411 and the second layer 412.

In an example, a film layer (cover lay) (not shown) may be disposed on an upper end (for example, an area in the direction of ① of FIG. 6A) of the first layer 411 of the flexible printed circuit board 410, and/or a lower end (for example, an area in the direction of ② of FIG. 6A) of the second layer 412. The above-described film layer may protect the first layer 411 and the second layer 412 of the flexible printed circuit board 410.

Referring to FIG. 6C, the flexible printed circuit board 410 according to another embodiment may include a first layer 411, a second layer 412 positioned on a lower end (for example, the direction of ② of FIG. 6C) of the first layer 411, and/or a third layer 413 positioned on a lower end (for example, the direction of ② of FIG. 6C) of the second layer 412.

In an example, a first conductive patch 420 and/or a second conductive patch 430 which is spaced apart from the first conductive patch 420 by a designated distance may be disposed on the first layer 411 of the flexible printed circuit board 410. In an example, a first guard ground 4111 including at least one groove 4111*a*, 4111*b* may additionally be disposed on the first layer 411 of the flexible printed circuit board 410. In an example, the first guard ground 4111 may be disposed to enclose the first conductive patch 420 and/or the second conductive patch 430 of the first layer 411. For example, the first conductive patch 420 may be disposed within the at least one groove 4111*a* of the first guard ground 4111, and the second conductive patch 430 may be disposed within a second groove 4111*b* of the first guard ground 4111, such that the first guard ground 4111 is disposed to enclose the first conductive patch 420 and/or the second conductive patch 430. In an example, the first guard ground 4111 may shield the first conductive patch 420 and/or the second conductive patch 430 from an external noise.

In an example, at least one signal wire 421, 431 may be disposed on the second layer 412 of the flexible printed circuit board 410. In an example, the at least one signal wire 421, 431 may include a first signal wire 421 to electrically connect the first conductive patch 420 and a wireless communication circuit, and/or a second signal wire 431 to electrically connect the second conductive patch 430 and the wireless communication circuit. In another example (not shown), at least one signal wire (not shown) may further be included on the second layer 412 of the flexible printed circuit board 410 to electrically connect the first conductive patch 420 and/or the second conductive patch 430 with a ground of the third layer 413. In an example, a second guard ground 4121 including at least one groove 4121*a*, 4121*b* may additionally be disposed on the second layer 412 of the flexible printed circuit board 410. In an example, the second guard ground 4121 may be disposed to enclose the at least one signal wire 421, 431 and to shield the at least one signal wire 421, 431 from an external noise. For example, the first signal wire 421 may be disposed within a third groove 4121*a* of the second guard ground 4121, and the second signal wire 431 may be disposed within a fourth groove 4121*b* of the second guard ground 4121, such that the second guard ground 4121 is disposed to enclose the first signal wire 421 and/or the second signal wire 431. The disposal positions of the first signal wire 421 and/or the second signal wire 431 are not limited to the illustrated embodiment of the disclosure, and according to an embodiment of the disclosure, the disposal positions of the first signal wire 421 and/or the second signal wire 431 may be changed.

In an example, the third layer 413 (or a "ground layer") of the flexible printed circuit board 410 may include the ground. Coupling (or "capacitive coupling") may be generated between the ground of the third layer 413 and the at least one signal wire 421, 431 of the second layer 412.

In an example, the first layer 411, the second layer 412, and/or the third layer 413 of the flexible printed circuit board 410 may be electrically connected with one another through at least one via (not shown) including a conductive material. In an example, at least one first penetrating hole (or "via hole") 411*a*, 411*b* may be formed on the guard ground 4111 of the first layer 411. In another example, at least one second penetrating hole 412*a*, 412*b* may be formed on a position of the second layer 412 corresponding to the at least one first penetrating hole 411*a*, 411*b* of the first layer 411, and at least one third penetrating hole 413*a*, 413*b* may be formed on a position of the third layer 413 corresponding to the at least one second penetrating hole 412*a*, 412*b* of the second layer 412. The at least one via may be disposed within the at least one first penetrating hole 411*a*, 411*b* of the first layer 411, the at least one second penetrating hole 412*a*, 412*b* of the second layer 412, and/or the at least one third penetrating hole 413*a*, 413*b* of the third layer 413, thereby electrically connecting the first layer 411, the second layer 412, and/or the third layer 413.

In an example, a dielectric (not shown) having a dielectric constant may be filled between the first layer 411 and the second layer 412 of the flexible printed circuit board 410 and/or between the second layer 412 and the third layer 413. In another example, a film layer (cover lay) (not shown) may be disposed on an upper end (for example, an area in the direction of ① of FIG. 6B) of the first layer 411 of the flexible printed circuit board 410, and/or a lower end (for example, an area in the direction of ② of FIG. 6B) of the third layer 413, and the above-described film layer may protect the first layer 411, the second layer 412, and/or the third layer 413 of the flexible printed circuit board 410.

Figure 7:
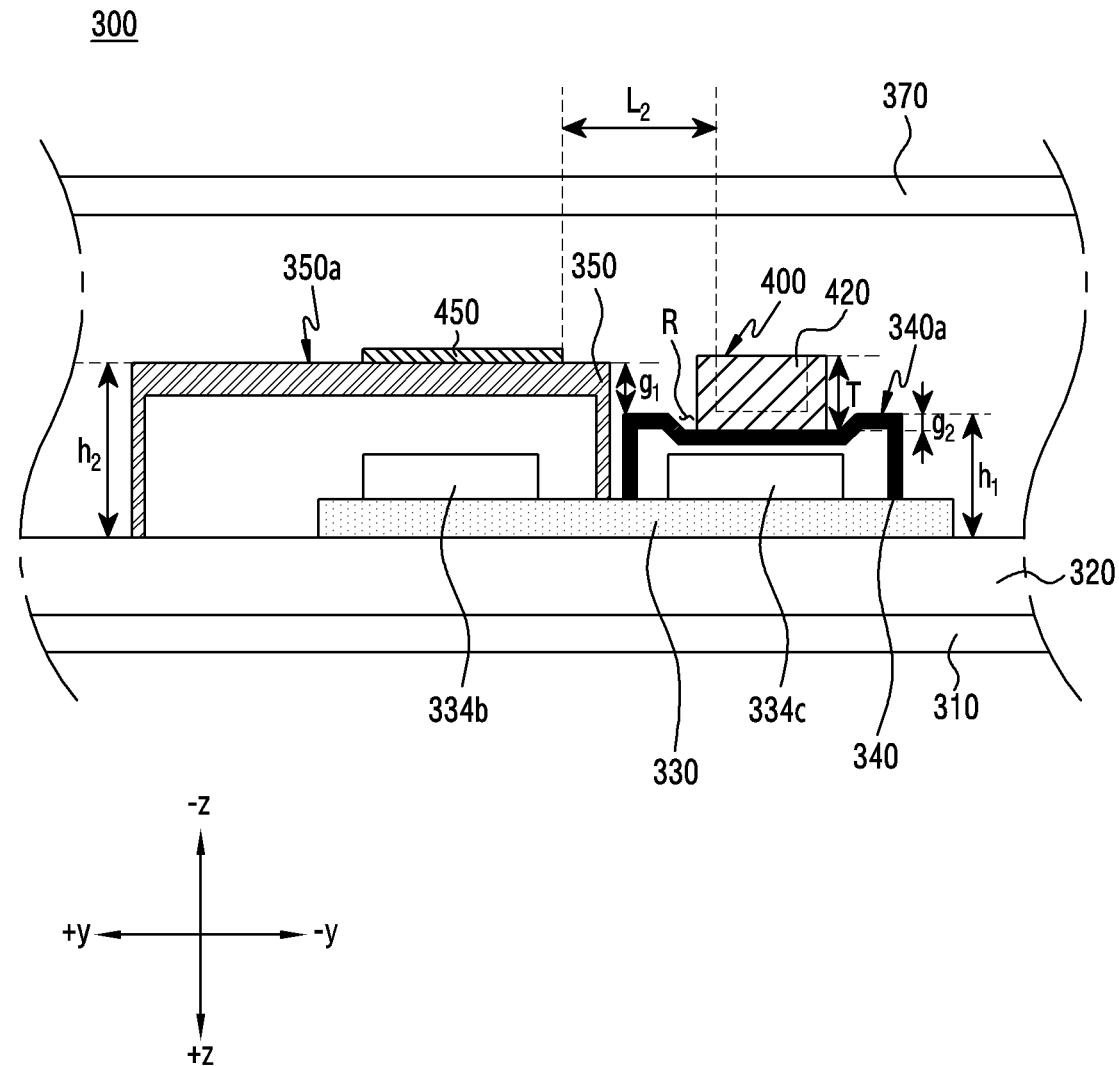
FIG. 7 is a cross-sectional view of an electronic device of FIG. 4, taken on line A-A', according to an embodiment of the disclosure.
Figure 8:
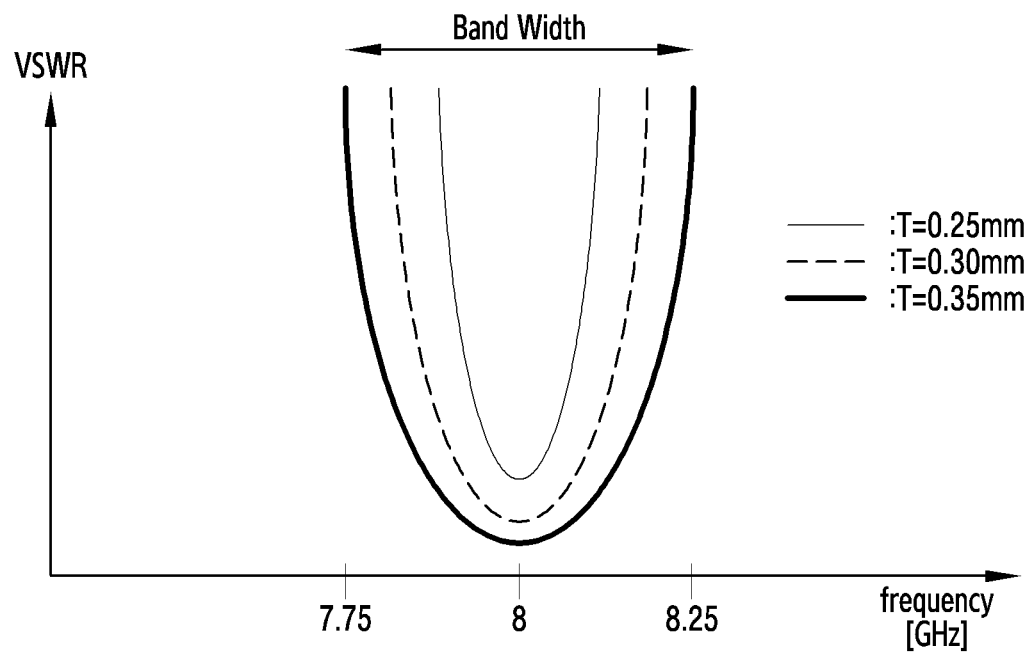
FIG. 8 is a graph illustrating changes in a voltage standing wave ratio (VSWR) according to a thickness of a patch antenna according to an embodiment of the disclosure.

FIG. 7 is a cross-sectional view of an electronic device of FIG. 4, taken on line A-A', according to an embodiment of the disclosure, and FIG. 8 is a graph illustrating changes in a voltage standing wave ratio (VSWR) according to a thickness of a patch antenna according to an embodiment of the disclosure.

FIG. 8 of the disclosure illustrates changes in the VSWR according to changes in the frequency, and, as the VSWR is lower, impedance matching in a corresponding frequency band may be performed more precisely. In this case, the thin solid line of FIG. 8 indicates changes in the VSWR if the thickness T of the patch antenna 400 is 0.25 mm, the dashed line indicates changes in the VSWR if the thickness T of the patch antenna 400 is 0.30 mm, and the thick solid line indicates changes in the VSWR if the thickness T of the patch antenna 400 is 0.35 mm.

Referring to FIG. 7, the electronic device 300 according to an embodiment may include a display 310 (for example, the display 310 of FIG. 5), the side surface member 320 (for example, the side surface member 320 of FIG. 5), the at least one printed circuit board 330 (for example, the at least one printed circuit board 330 of FIG. 5), at least one electronic component 334a, 334b, 334c (for example, the at least one electronic component 334a, 334b, 334c of FIG. 5), a first support structure 340 (for example, the first support structure 340 of FIG. 5), a second support structure 350 (for example, the second support structure 350 of FIG. 5), a rear surface plate 370 (for example, the rear surface plate 370 of FIG. 5), a patch antenna 400 (for example, the patch antenna 400 of FIG. 5), and/or a conductive pattern 450 (for example, the conductive pattern 450 of FIG. 5). At least one of the components of the electronic device 300 according to an embodiment may be the same as or similar to at least one of the components of the electronic device 300 of FIG. 5, and a redundant explanation thereof is omitted.

According to an embodiment of the disclosure, the patch antenna 400 may be disposed on one surface 340a of the first support structure 340 that faces the rear surface plate 370, and the conductive pattern 450 may be disposed on one surface 350a of the second support structure 350 disposed adjacent to the first support structure 340 that faces the rear surface plate 370. In an example, the patch antenna 400 disposed on the first support structure 340 and the conductive pattern 450 disposed on the second support structure 350 may be fed from a wireless communication circuit (not shown) (for example, the wireless communication module 192 of FIG. 1) disposed on the at least one printed circuit board 330. Accordingly, the patch antenna 400 and/or the conductive pattern 450 may operate as an antenna radiator to transmit and/or receive an RF signal of a designated frequency band. For example, the patch antenna 400 and the conductive pattern 450 may operate as antenna radiators to transmit and/or receive an RF signal of a UWB frequency band (for example, about 6.25 GHz to about 8.75 GHz).

Referring to FIG. 8, it can be seen that as the thickness T of the patch antenna 400 is thicker, the resonance characteristics of the patch antenna 400 is enhanced. For example, as the thickness T of the patch antenna 400 gradually increases from 0.25 mm to 0.35 mm, the bandwidth of the patch antenna 400 may be wider.

According to an embodiment of the disclosure, the electronic device 300 may form a gap $g_1$ between the first support structure 340 and the second support structure 350, by forming a difference between the height $h_1$ of the first support structure 340 and the height $h_2$ of the second support structure 350. In an example, the electronic device 300 may guarantee a space to have the patch antenna 400 having a designated thickness disposed therein between the first support structure 340 and the rear surface plate 370 through the gap $g_1$ formed between the first support structure 340 and the second support structure 350. For example, the gap $g_1$ formed between the first support structure 340 and the second support structure 350 may be about 0.25 mm, and the patch antenna 400 having a thickness of about 0.25 mm may be disposed between the first support structure 340 and the rear surface plate 370.

According to an embodiment of the disclosure, the electronic device 300 may additionally guarantee a space to have the patch antenna 400 disposed therein between the first support structure 340 and the rear surface plate 370 by forming a recess (for example, an R area of FIG. 7) on one surface 340a of the first support structure 340 that faces the rear surface plate 370. In an example, the recess R depressed in a direction toward the side surface member 320 may be formed on at least one area of the one surface 340a of the first support structure 340 that faces the rear surface plate 370. For example, the recess R may be formed on the first support structure 340 by cutting out at least one area of the one surface 340a of the first support structure 340 that faces the rear surface plate 370 by a first depth (for example, $g_2$) in the direction toward the side surface member 320. In an example, the patch antenna 400 may be disposed in the above-described recess R of the first support structure 340.

For example, the electronic device 300 according to an embodiment may additionally guarantee the space to have the patch antenna 400 disposed therein between the first structure 340 and the rear surface plate 370, by forming not only the gap $g_1$ between the first support structure 340 and the second support structure 350, but also the recess R depressed from at least one area of the first support structure 340 by the first depth $g_2$. For example, the gap $g_1$ between the first support structure 340 and the second support structure 350 may be about 0.25 mm, and the recess R of a depth of about 0.05 mm may be formed on at least one area of the first support structure 340, such that a space of about 0.30 mm is formed between the first support structure 340 and the rear surface plate 370. Accordingly, the patch antenna 400 of a thickness of about 0.30 mm may be disposed between the first support structure 340 and the rear surface plate 370. The electronic device 300 additionally guarantees the space between the first support structure 340 and the rear surface plate 370 through the recess R, so that the thickness of the dielectric forming the patch antenna 400 can be made to be thick, and accordingly, radiation performance of the patch antenna 400 can be enhanced.

Figure 9:
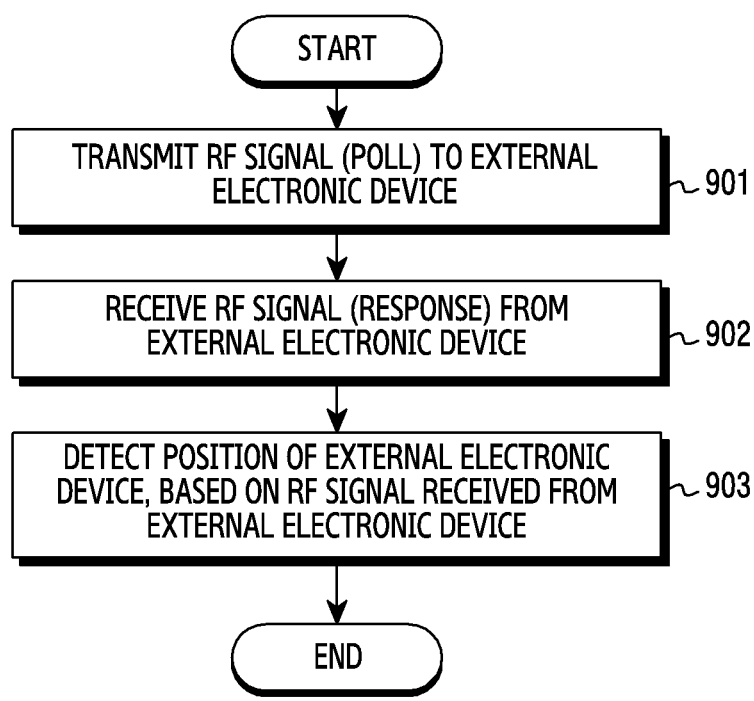
FIG. 9 is a sequence diagram illustrating an operation of an electronic device detecting a position of an external electronic device according to an embodiment of the disclosure.
Figure 10A:
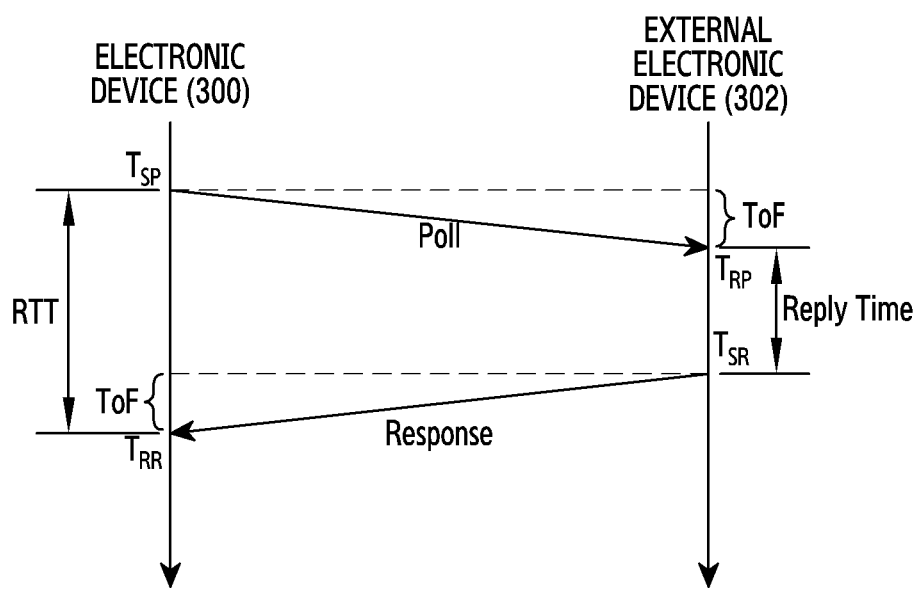
FIG. 10A is a view illustrating a signal transmission process between an electronic device and an external electronic device according to an embodiment of the disclosure.
Figure 10B:
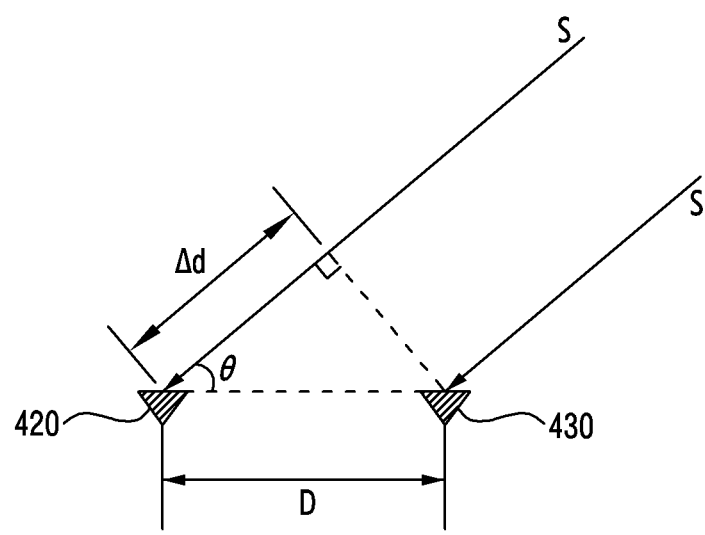
FIG. 10B is a view illustrating a process of an electronic device calculating an angle of arrival (AOA) through a signal received from an external electronic device according to an embodiment of the disclosure.

FIG. 9 is a sequence diagram illustrating an operation of an electronic device detecting a position of an external electronic device according to an embodiment of the disclosure, FIG. 10A is a view illustrating a signal transmission process between an electronic device and an external electronic device according to an embodiment of the disclosure, and FIG. 10B is a view illustrating a process of an electronic device calculating an AOA through a signal received from an external electronic device according to an embodiment of the disclosure.

FIG. 10B illustrates a process of the electronic device receiving an RF signal from an external electronic device 302 by using a first conductive patch 420 and a second conductive patch 430, but embodiments of the disclosure are not limited to the illustrated embodiment. According to an embodiment of the disclosure, the electronic device may receive an RF signal through the first conductive patch 420 and a conductive pattern (for example, the conductive pattern 450 of FIG. 4), or may receive an RF signal by using the second conductive patch 430 and the conductive pattern. Hereinafter, the operation of the electronic device of FIG. 9 detecting a position of an external electronic device will be described with reference to FIGS. 10A and/or FIG. 10B.

Referring to FIGS. 9, 10A and 10B, in operation 901, a processor (for example, the processor 120 of FIG. 1) of the electronic device 300 (for example, the electronic device 300 of FIGS. 4 and 5) according to an embodiment may transmit an RF signal of a designated frequency band to the external electronic device 302 by using at least one of the first conductive patch 420 (for example, the first conductive patch 420 of FIG. 4), the second conductive patch 430 (for example, the second conductive patch 430 of FIG. 4), and/or the conductive pattern (for example, the conductive pattern 450 of FIGS. 4 and 5). In an example, the processor may transmit an RF signal of a UWB frequency band to the external electronic device 302 by using the first conductive patch 420, which operates as an antenna radiator to transmit and receive an RF signal of a designated frequency band. For example, the RF signal transmitted to the external electronic device 302 from the electronic device 300 may include a message (or a "poll message") requesting position detection (ranging).

Referring to FIG. 9, in operation 902, the processor of the electronic device 300 according to an embodiment may receive an RF signal (for example, S of FIG. 10B) of a designated frequency band from the external electronic device 302 by using at least two of the first conductive patch 420, the second conductive patch 430, or the conductive pattern (for example, the conductive pattern 450 of FIGS. 4 and 5). In an example, the external electronic device 302 may transmit an RF signal of a designated frequency band to the electronic device 300 in response to the RF signal being transmitted 302 from the electronic device 300 to the external electronic device. In another example, the processor of the electronic device 300 may receive the RF signal of the designated frequency band transmitted from the external electronic device 302 by using the first conductive patch 420 and/or the second conductive patch 430. For example, the RF signal received from the external electronic device 302 may be an RF signal of a UWB frequency band, and a position detection response message may be included in the above-described RF signal.

Referring to FIG. 9, in operation 903, the processor of the electronic device 300 according to an embodiment may detect or determine a position of the external electronic device 302, based on the RF signal received from the external electronic device 302.

Referring to FIG. 10A, in an embodiment of the disclosure, the processor of the electronic device 300 may calculate a distance between the electronic device 300 and the external electronic device 302 by using a two-way ranging (TWR) method for exchanging signals between the electronic device 300 and the external electronic device 302. For example, the processor of the electronic device 300 may measure a time $T_{SP}$ at which the position detection request message (poll message) transmitted to the external electronic device 302 in operation 901 described above is transmitted. The RF signal transmitted to the external electronic device 302 by the electronic device 300 may arrive at the external electronic device 302 after a time of light (ToF) is elapsed. The external electronic device 302 may receive the RF signal from the electronic device 300, and, after a designated time (for example, a reply time) is elapsed, the external electronic device 302 may transmit a position detection response message to the electronic device 300. The above-described designated time may refer to a difference between a time $T_{RP}$ at which the external electronic device 302 receives the RF signal from the electronic device 300, and a time $T_{SR}$ at which the external electronic device 302 transmits the RF signal to the electronic device 300. The RF signal transmitted to the electronic device 300 by the external electronic device 302 may arrive at the electronic device 300 after a predetermined time ToF is elapsed. In an example, the processor of the electronic device 300 may calculate a round trip time (RTT), based on the time $T_{SP}$ at which the RF signal is transmitted to the external electronic device 302 in operation 901, and/or a time $T_{RR}$ at which the RF signal is received from the external electronic device 302 in operation 902. For example, the RTT may refer to a difference between the time $T_{SP}$ at which the electronic device 300 transmits the RF signal to the external electronic device 302, and the time $T_{RR}$ at which the RF signal transmitted by the external electronic device 302 is received. In an example, the processor may calculate the distance between the electronic device 300 and the external electronic device 302 based on the calculated RTT.

In another example, the processor of the electronic device 300 may calculate an angle of arrival (AOA) (θ) of the above-described RF signal by using a phase difference (ΔΦ)) of the RF signal (S) transmitted by the external electronic device 302. In an example, the processor of the electronic device 300 may receive the RF signal (S) from the external electronic device 302 by using the first conductive patch 420 and/or the second conductive patch 430. In another example, the processor may calculate a reception distance difference (Δd) of the RF signal (S) received through the first conductive patch 420 and/or the second conductive patch 430, and may calculate the phase difference (ΔΦ), based on the calculated reception distance difference (Δd). For example, the processor may calculate the phase difference (ΔΦ) of the RF signal (S) received through the first conductive patch 420 and/or the second conductive patch 430, by using Equation 1 presented below. λ in Equation 1 may refer to a wavelength of the RF signal (S) received from the external electronic device 302.

$$\Delta\emptyset = \frac{2\pi}{\lambda}\Delta d \qquad \text{Equation 1}$$

In an example, the processor may calculate the AOA (θ) of the RF signal (S) received from the external electronic device 302 by using the phase difference (ΔΦ) of the RF signal (S) received through the first conductive patch 420 and/or the second conductive patch 430, and/or a distance (D) between the first conductive patch 420 and the second conductive patch 430. For example, the processor may calculate the AOA (θ) of the RF signal (S) received from the external electronic device 302 by using Equation 2 presented below.

$$AOA(\theta) = \cos^{-1}\frac{\Delta\emptyset}{2\pi D/\lambda} \qquad \text{Equation 2}$$

According to an embodiment of the disclosure, the processor of the electronic device 300 may calculate the distance between the electronic device 300 and the external electronic device 302 and/or an angle between the electronic device 300 and the external electronic device 302, based on the RTT measured through the above-described process and/or the AOA (θ) of the RF signal (S) received from the external electronic device 302. In an example, information on the magnetic north direction may be acquired through a magnetic field sensor (or a "geomagnetic sensor") of the electronic device 300 or a global navigation satellite system (GNSS) (for example, a global positioning system (GPS)). In another example, the processor of the electronic device 300 may calculate a relative azimuth between the information on the magnetic north direction obtained and the AOA (θ) of the RF signal (S), and may calculate a direction of the external electronic device 302 or the angle between the electronic device 300 and the external electronic device 302, by using the calculated relative azimuth. In an example, the processor of the electronic device 300 may detect the position of the external electronic device 302, based on the distance between the electronic device and the external electronic device 302 and/or the angle between the electronic device 300 and the external electronic device 302, which is calculated.

Figure 11:
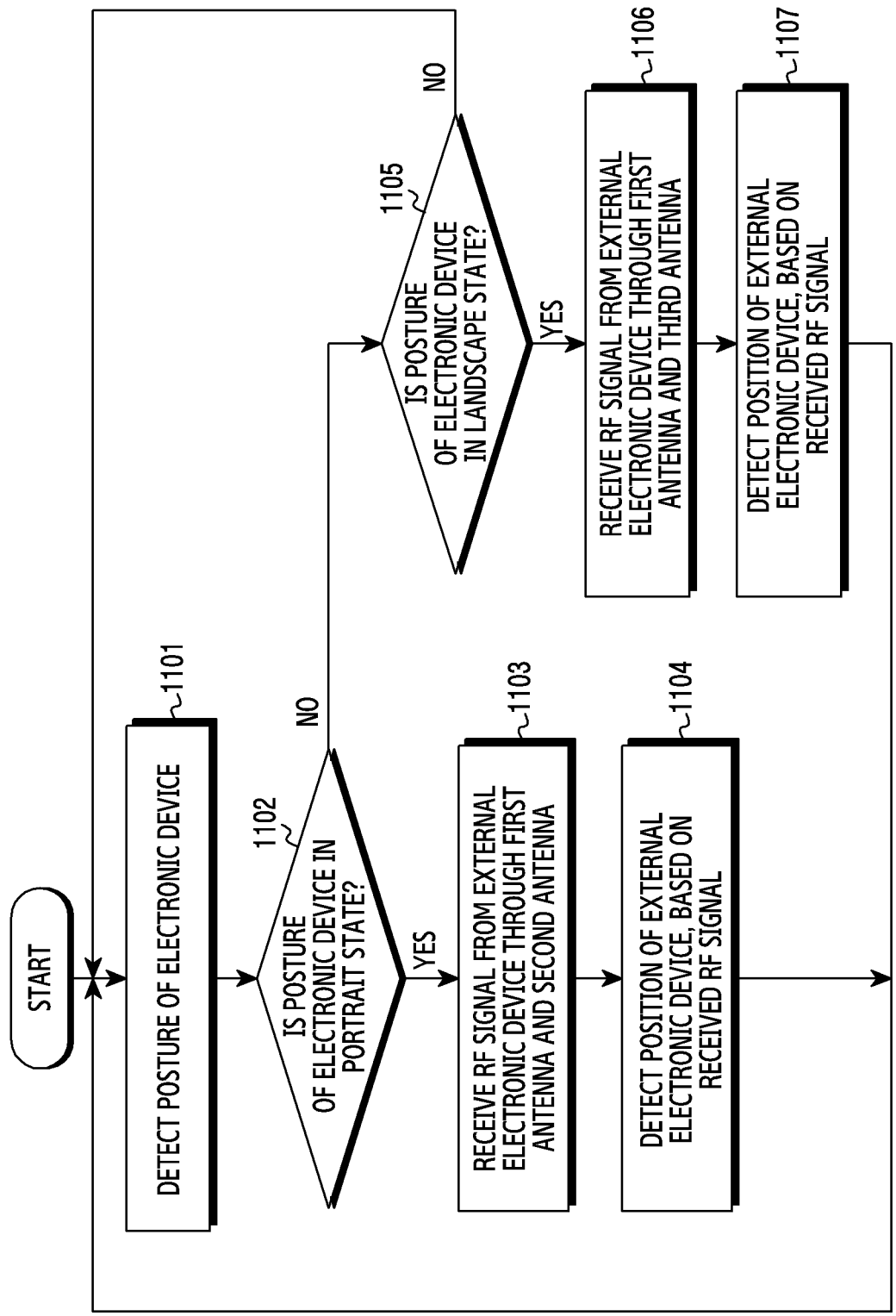
FIG. 11 is a flowchart illustrating an operation of an electronic device determining a position of an external electronic device according to a posture of the electronic device according to an embodiment of the disclosure.
Figure 12A:
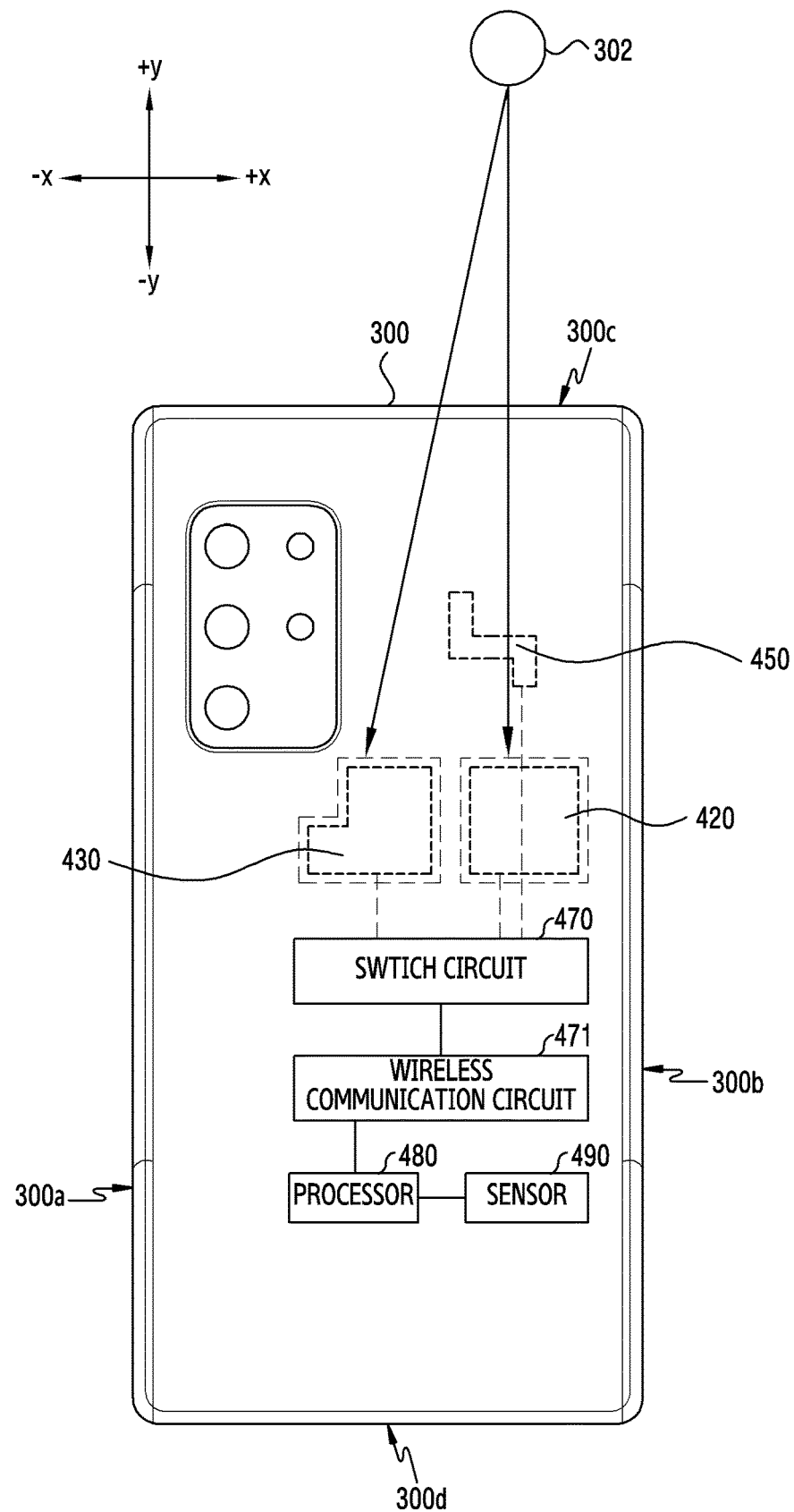
FIG. 12A is a view illustrating a process of an electronic device detecting a position of an external electronic device when a posture of the electronic device is in a portrait state according to an embodiment of the disclosure.
Figure 12B:
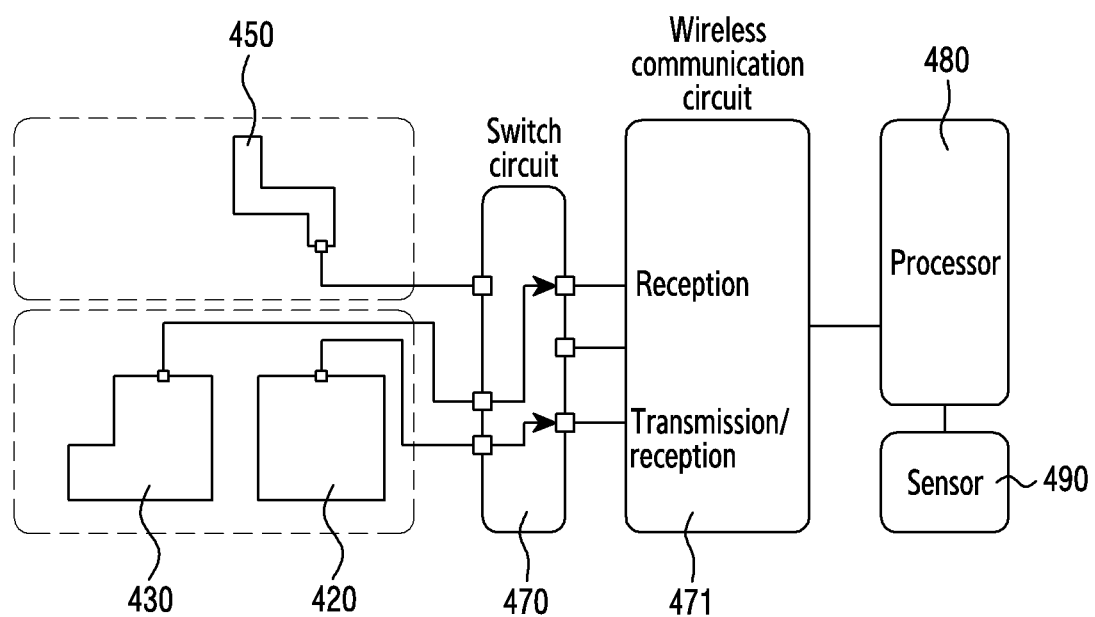
FIG. 12B is a view illustrating electric connection relationships among an antenna, a switch circuit, a wireless communication circuit, a processor, and at least one sensor of an electronic device of FIG. 12A according to an embodiment of the disclosure.

FIG. 11 is a flowchart illustrating an operation of an electronic device detecting a position of an external electronic device according to a posture of the electronic device according to an embodiment of the disclosure, FIG. 12A is a view illustrating a process of an electronic device detecting a position of an external electronic device when the posture of the electronic device is in a portrait state according to an embodiment of the disclosure, and FIG. 12B is a view illustrating electric connection relationships among an antenna, a switch circuit, a wireless communication circuit, a processor, and at least one sensor of an electronic device of FIG. 12A according to an embodiment of the disclosure.

Figure 13A:
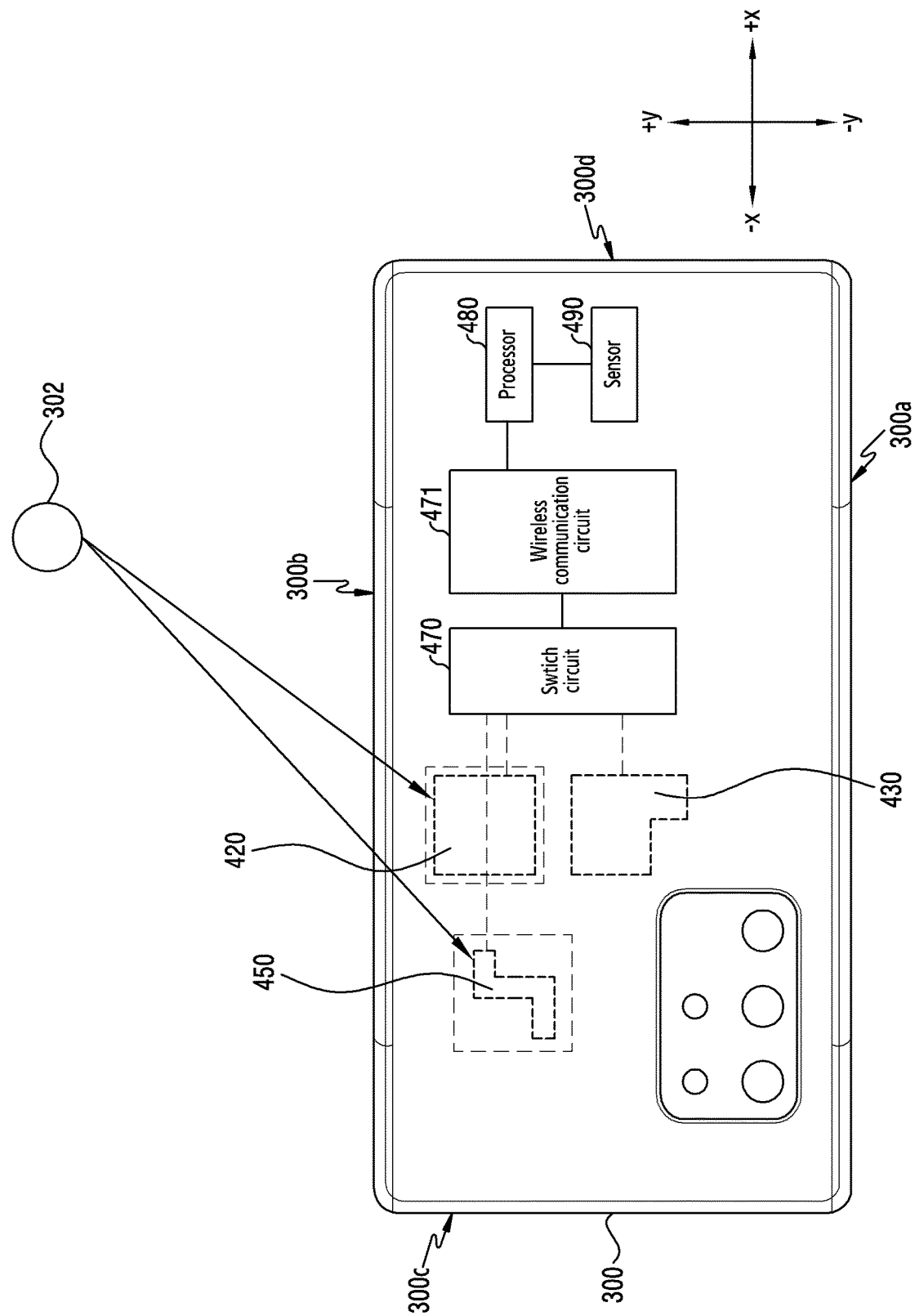
FIG. 13A is a view illustrating a process of an electronic device detecting a position of an external electronic device when a posture of the electronic device is in a landscape state according to an embodiment of the disclosure.
Figure 13B:
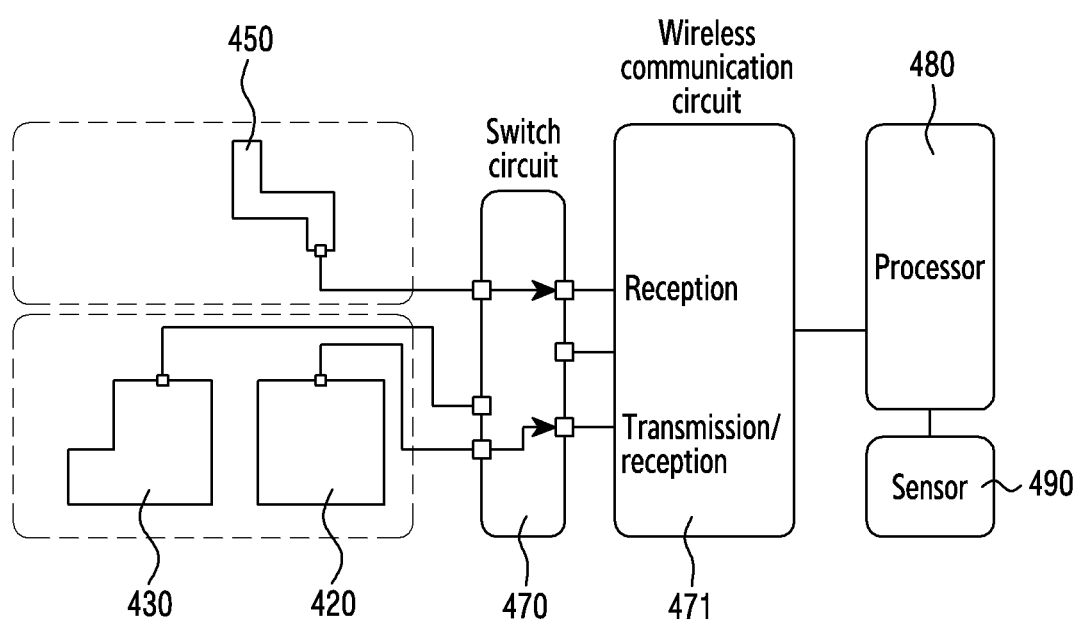
FIG. 13B is a view illustrating electric connection relationships among an antenna, a switch circuit, a wireless communication circuit, a processor, and at least one sensor of an electronic device of FIG. 13A according to an embodiment of the disclosure.

FIG. 13A is a view illustrating a process of an electronic device detecting a position of an external electronic device when a posture of the electronic device is in a landscape state according to an embodiment of the disclosure, and FIG. 13B is a view illustrating electric connection relationships among an antenna, a switch circuit, a wireless communication circuit, a processor, and at least one sensor of an electronic device of FIG. 13A according to an embodiment of the disclosure.

Hereinafter, the operation of the electronic device detecting the position of the external electronic device in FIG. 11 will be described with reference to FIGS. 12A, 12B, 13A, and 13B.

Referring to FIGS. 11, 12A, 12B, 13A, and 13B, the electronic device 300 according to an embodiment may include a first conductive patch 420 (for example, the first conductive patch 420 of FIGS. 4 and 5), a second conductive patch 430 (for example, the second conductive patch 430 of FIGS. 4 and 5), a conductive pattern 450 (for example, the conductive pattern 450 of FIGS. 4 and 5), a switch circuit 470, a wireless communication circuit 471, a processor 480 (for example, the processor 120 of FIG. 1), and/or at least one sensor 490. At least one of the components of the electronic device 300 according to an embodiment may be the same as or similar to at least one of the components of the electronic device 300 of FIGS. 4 and/or 5, and a redundant explanation thereof is omitted.

According to an embodiment of the disclosure, the switch circuit 470 may be electrically connected with the first conductive patch 420, the second conductive patch 430, the conductive pattern 450, which operate as antenna radiators, and/or the wireless communication circuit 471. In an example, the switch circuit 470 may selectively connect the first conductive patch 420, the second conductive patch 430, and/or the conductive pattern 450 with the wireless communication circuit 471. Referring to FIG. 12B, when the switch circuit 470 is in a first electric connection state, the first conductive patch 420 may be electrically connected to a transmission and/or reception port of the wireless communication circuit 471, and the second conductive patch 430 may be electrically connected to a reception port of the wireless communication circuit 471. Referring to FIG. 13B, when the switch circuit 470 is in a second electric connection state, the first conductive patch 420 may be electrically connected to the transmission and/or reception port of the wireless communication circuit 471, and the conductive pattern 450 may be electrically connected to the reception port of the wireless communication circuit 471.

According to an embodiment of the disclosure, the wireless communication circuit 471 may be electrically connected with the switch circuit 470 to control the electric connection state of the switch circuit 470. For example, the wireless communication circuit 471 may control the electric connection state of the switch circuit 470 as the first electric connection state to electrically connect with the first conductive patch 420 and/or the second conductive patch 430. In another example, the wireless communication circuit 472 may control the electric connection state of the switch circuit 470 as the second electric connection state to electrically connect with the first conductive patch 420 and/or the conductive pattern 450. In an example, the wireless communication circuit 471 may control the electric connection state of the switch circuit 470 to feed at least two antenna radiators from among the first conductive patch 420, the second conductive patch 430, or the conductive pattern 450 which operates as the antenna radiator. For example, the wireless communication circuit 471 may control the switch circuit 470 in the first electric connection state to feed the first conductive patch 420 and the second conductive patch 430. In another example, the wireless communication circuit 471 may control the switch circuit 470 in the second electric connection state to feed the first conductive patch 420 and the conductive pattern 450. According to an embodiment of the disclosure, the processor 480 of the electronic device 300 may be electrically connected with the wireless communication circuit 471 and/or the at least one sensor 490. In an example, the processor 480 may detect a current posture of the electronic device 300 through the at least one sensor 490. For example, the at least one sensor 490 may include at least one of a gyro sensor, a position sensor, but is not limited thereto. In an example, the processor 480 may determine whether the current posture of the electronic device 300 is in a portrait state or a landscape state through the at least one sensor 490. For example, the electronic device 300 may include a first side surface 300a which is extended along a first direction (for example, the +y direction of FIG. 12A), a second side surface 300b which is parallel to the first side surface 300a, a third side surface 300c which is extended along a second direction (for example, the +x direction of FIG. 12A) perpendicular to the first direction and connects one end (for example, one end in the +y direction of FIG. 12A) of the first side surface 300a and one end (for example, one end in the +y direction of FIG. 12A) of the second side surface 300b, and/or a fourth side surface 300d which is parallel to the third side surface 300c and connects the other end (for example, one end in the -y direction of FIG. 12A) of the first side surface 300a and the other end (for example, one end in the -y direction of FIG. 12A) of the second side surface 300b. In an example, the first side surface 300a and the second side surface 300b of the electronic device 300 may be formed to have lengths relatively longer than the third side surface 300c and the fourth side surface 300d. The posture of the electronic device 300 being in the "portrait state" in the disclosure may refer to a state in which the third side surface 300c or the fourth side surface 300d which is relatively short from among the side surfaces of the electronic device 300 is positioned on a lower end (for example, the -y direction of FIG. 12A) of the electronic device 300. The posture of the electronic device 300 being in the "landscape state" in the disclosure may refer to a state in which the first side surface 300a or the second side surface 300b which is relatively long from among the side surfaces of the electronic device 300 is positioned on a lower end (for example, the -y direction of FIG. 13A) of the electronic device 300. The "portrait state" and/or the "landscape state" in the disclosure may be distinguished by a user interface (UI) and/or a user experience (UX) seen through a display (for example, the display 201 of FIG. 2A). For example, the UI and/or the UX seen through the display in the "portrait state" and the UI and/or UX seen through the display in the "landscape state" may be substantially perpendicular to each other.

In another example, the processor 480 may be electrically connected with the wireless communication circuit 471, thereby controlling operations of the first conductive patch 420, the second conductive patch 430, and/or the conductive pattern 450 electrically connected with the wireless communication circuit 471 through the switch circuit 470. For example, the processor 480 may detect a position of an external electronic device 302 (for example, the external electronic device 302 of FIG. 10A) by using at least two of the first conductive patch 420, the second conductive patch 430, and/or the conductive pattern 450 as antenna radiators, according to a posture of the electronic device 300 detected by the at least one sensor 490. Hereinafter, the operation of the processor 480 detecting a position of the external electronic device 302 according to a posture of the electronic device 300 will be described.

Referring to FIG. 11, in operation 1101, the processor 480 of the electronic device 300 according to an embodiment may detect a current posture of the electronic device 300 through the at least one sensor 490. In an example, the processor 480 may detect whether the posture of the electronic device 300 is in the portrait state or landscape state through the at least one sensor 490. For example, the at least one sensor 490 may be a 9-axis motion sensor, and the processor 480 may form a virtual coordinate space based on azimuth (or "yaw"), pitch, roll values which are measured by the 9-axis motion sensor, and may classify a certain area of the coordinate space into a landscape range and may classify another area of the coordinate space into a portrait range. The above-described processor 480 may detect whether the posture of the electronic device 300 is in the portrait state or the landscape state, based on whether the current posture of the electronic device 300 belongs to the landscape range or the portrait range.

Referring to FIG. 11, in operation 1102, the processor 480 according to an embodiment may determine whether the posture of the electronic device 300 detected in operation 1101 is in the portrait state in operation 1102.

Referring to FIG. 12A, when it is determined that the state of the electronic device 300 is in the portrait state in operation 1102, the processor 480 according to an embodiment may receive an RF signal from the external electronic device 302 by using a first antenna and a second antenna which are arranged in a direction (for example, the +x direction or –x direction of FIG. 12A) substantially perpendicular to the electronic device 300 in the portrait state in operation 1103. For example, the processor 480 may receive the RF signal from the external electronic device 302 by using the first conductive patch 420 and the second conductive patch 430 which are arranged in a direction perpendicular to the electronic device 300 in the portrait state. In another example (for example, FIG. 12B), the processor 480 may disable the conductive pattern 450 and may enable the first conductive patch 420 and the second conductive patch 430, by controlling the electric connection state of the switch circuit 470 through the wireless communication circuit 471. Accordingly, the electronic device 300 may receive the RF signal from the external electronic device 302 by using the first conductive patch 420 and the second conductive patch 430 which are arranged in the direction substantially perpendicular to the electronic device 300 in the portrait state.

Referring to FIG. 11, in operation 1104, the processor 480 according to an embodiment may detect a position of the external electronic device 302, based on the RF signal received from the external electronic device 302 through operation 1103. In an example, the processor 480 may calculate an RTT and/or an AOA of the RF signal, based on the RF signal received from the external electronic device 302 through the first conductive patch 420 and the second conductive patch 430. In another example, the processor 480 may calculate a distance between the electronic device 300 and the external electronic device 302, based on the calculated RTT, and may calculate an angle between the electronic device 300 and the external electronic device 302, based on the calculated AOA of the RF signal. In still another example, the processor 480 may detect the position of the external electronic device 302, based on the distance and/or the angle between the electronic device 300 and the external electronic device 302, through the above-described process. In an example, the processor 480 may detect the position of the external electronic device 302 through operations 901 to 903 of FIG. 9 described above, and a redundant explanation is omitted.

When it is determined that the posture of the electronic device 300 is not in the portrait state in operation 1101, the processor 480 of the electronic device 300 according to an embodiment may determine whether the current posture of the electronic device 300 is in the landscape state in operation 1105. Although it is illustrated on the drawing that operation 1102 precedes operation 1105, this should not be considered as limiting. According to various embodiments of the disclosure, operation 1102 may be performed after operation 1105 or operations 1102 and 1105 may be performed simultaneously.

Referring to FIG. 13A, when it is determined that the current posture of the electronic device 300 is in the landscape state in operation 1105, the processor 480 according to an embodiment may receive an RF signal from the external electronic device 302 by using the first antenna and a third antenna which are arranged in a direction (for example, the +x direction of FIG. 13A) substantially perpendicular to the electronic device 300 in the landscape state in operation 1106. For example, the processor 480 may receive the RF signal from the external electronic device 302 by using the first conductive patch 420 and the conductive pattern 450 which are arranged in the direction substantially perpendicular to the electronic device 300 in the landscape state. In another example (for example, see FIG. 13B), the processor 480 may disable the second conductive patch 430 and may enable the first conductive patch 420 and the conductive pattern 450, by controlling the electric connection state of the switch circuit 470 through the wireless communication circuit 471. Accordingly, the electronic device 300 may receive the RF signal from the external electronic device 302 by using the first conductive patch 420 and the conductive pattern 450 which are arranged in the direction substantially perpendicular to the electronic device 300 in the landscape state.

In operation 1107, the processor 480 according to an embodiment may detect a position of the external electronic device 302, based on the RF signal received from the external electronic device 302 in operation 1106. In an example, the processor 480 may calculate an RTT and/or an AOA of the RF signal, based on the RF signal received from the external electronic device 302 through the first conductive patch 420 and the conductive pattern 450. In another example, the processor 480 may calculate a distance between the electronic device 300 and the external electronic device 302, based on the calculated RTT, and may calculate an angel between the electronic device 300 and the external electronic device 302, based on the calculated AOA of the RF signal. In still another example, the processor 480 may detect the position of the external electronic device 302, based on the distance and/or angle between the electronic device 300 and the external electronic device 302, through the above-described process. For example, the electronic device 300 according to an embodiment may detect the position of the external electronic device 302 by using at least two of the first conductive patch 420, the second conductive patch 430, or the conductive pattern 450, which operates as an antenna radiator, according to the current posture of the electronic device 300.

In the above-described embodiment of the disclosure, the operation of the electronic device 300 receiving the RF signal from the external electronic device 302 by using two antenna radiators, and calculating the distance and/or the angle between the electronic device 300 and the external electronic device 302, based on the RF signal received from the external electronic device 302 has been described, but the operation of the electronic device 300 calculating the distance and/or the angle between the electronic device 300 and the external electronic device 302 is not limited to the above-described embodiment. According to another embodiment (not shown), the electronic device 300 may receive the RF signal from the external electronic device 302 by using all of the first antenna (for example, the first conductive patch 420), the second antenna (for example, the second conductive patch 430), and the third antenna (for example, the conductive pattern 450), and may calculate the distance and/or the angle between the electronic device 300 and the external electronic device 302, based on the received RF signal.

Figure 14:
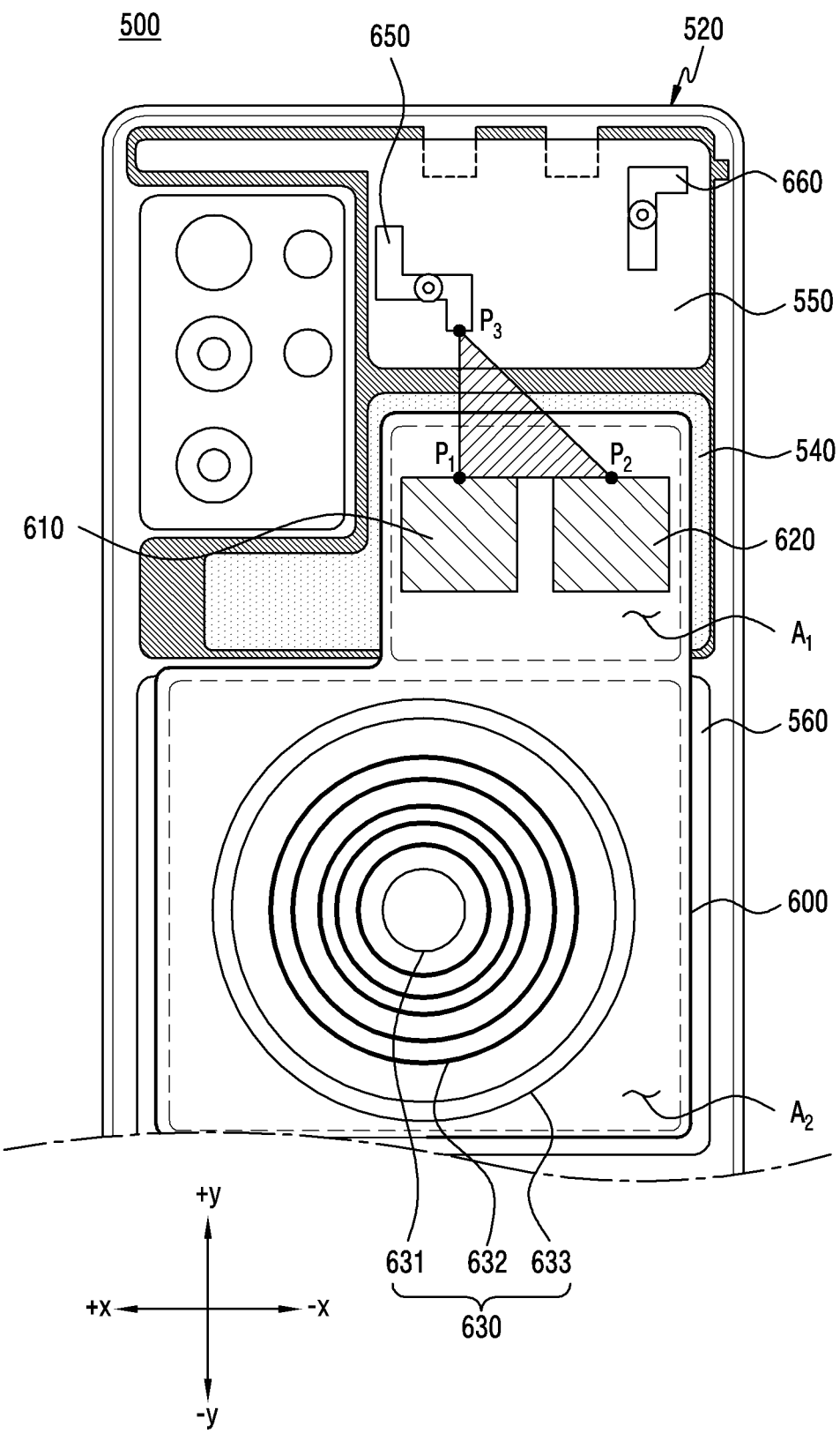
FIG. 14 is a view illustrating a first support structure, a second support structure, and an antenna radiator disposed on the first support structure and the second support structure in an electronic device according to an embodiment of the disclosure.

FIG. 14 is a view illustrating a first support structure, a second support structure, and an antenna radiator which is disposed on the first support structure and the second support structure in an electronic device according to an embodiment of the disclosure.

Referring to FIG. 14, the electronic device 500 according to an embodiment may include a side surface member 520 (for example, the side surface member 320 of FIG. 4), a printed circuit board 530 (for example, the at least one printed circuit board 330 of FIG. 4), a first support structure 540 (for example, the first support structure 340 of FIG. 4), a second support structure 550 (for example, the second support structure 350 of FIG. 4), a battery 560 (for example, the battery 360 of FIG. 3), a flexible printed circuit board 600, and/or at least one conductive pattern 650, 660. At least one of the components of the electronic device 500 according to an embodiment may be the same as or similar to at least one of the components of the electronic device 300 of FIG. 4, and a redundant explanation thereof is omitted.

According to an embodiment of the disclosure, the flexible printed circuit board 600 may be positioned on at least one area of the first support structure 540 and/or the battery 560, and may include a first area $A_1$ and/or a second area $A_2$. In an example, the first area $A_1$ of the flexible printed circuit board 600 may be disposed on a position overlapping at least one area of the first support structure 540, and the second area $A_2$ of the flexible printed circuit board 600 may be disposed on a position overlapping at least one area of the battery 560.

According to an embodiment of the disclosure, the first area $A_1$ of the flexible printed circuit board 600 may include a plurality of layers. In an example, the first area $A_1$ of the flexible printed circuit board 600 may include a first layer (for example, the first layer 411 of FIG. 6A) on which a first conductive patch 610 (for example, the first conductive patch 420 of FIG. 4) and/or a second conductive patch 620 (for example, the second conductive patch 430 of FIG. 4) are disposed, a second layer (for example, the second layer 412 of FIG. 6A) including a ground, and/or a dielectric disposed between the first layer and the second layer. In an example, the first conductive patch 610 disposed on the first layer of the first area $A_1$ may be disposed to be spaced apart from the second conductive patch 620. In another example, the first conductive patch 610 and/or the second conductive patch 620 may be electrically connected with a wireless communication circuit (for example, the wireless communication module 192 of FIG. 1) disposed on the printed circuit board 530, through an electric connection member (not shown) (for example, the signal wire 421, 431 of FIG. 6A). Through the above-described electric connection structure, the first conductive patch 610 and/or the second conductive patch 620 may be fed from the wireless communication circuit. For example, the first conductive patch 610 may be fed from the wireless communication circuit at a first point $P_1$, and the second conductive patch 620 may be fed from the wireless communication circuit at a second point $P_2$. In an example, the first conductive patch 610 and/or the second conductive patch 620 may operate as an antenna radiator to transmit and/or receive an RF signal of a designated frequency band. For example, the first conductive patch 610 and/or the second conductive patch 620 may operate as an antenna radiator to transmit and/or receive an RF signal of a UWB frequency band (for example, about 6.25 GHz to 8.75 GHz).

According to an embodiment of the disclosure, at least one coil 630 may be disposed on the second area $A_2$ of the flexible printed circuit board 600. In an example, an NFC coil 631 may be disposed on at least one area of the second area $A_2$ to perform short-range wireless communication. In another example, a wireless charging coil 632 for transmitting and/or receiving power to and/or from an external electronic device (for example, the external electronic device 102, 104 of FIG. 1), and/or a magnetic secure transmission (MST) coil 633 for a wireless payment may be disposed on at least one area of the second area $A_2$. For example, the electronic device 500 according to an embodiment may have the first conductive patch 610 and/or the second conductive patch 620 disposed on at least one area of the flexible printed circuit board 600 on which the at least one coil 630 is disposed, and may use the first conductive patch 610 and/or the second conductive patch 620 described above as an antenna radiator.

According to an embodiment of the disclosure, the second support structure 550 may be formed with a nonconductive material (for example, plastic, polymer) and may be disposed adjacent to the first area $A_1$ of the flexible printed circuit board 600. In an example, the at least one conductive pattern 650, 660 may be disposed on at least one area of the second support structure 550. For example, a first conductive pattern 650 and/or a second conductive pattern 660 spaced apart from the first conductive pattern 650 may be disposed on at least one area of the second support structure 550. In an example, the first conductive pattern 650 and/or the second conductive pattern 660 may be formed by drawing a pattern on at least one area of the second support structure 550 through lasers, and then patterning a conductive material (for example, metal), but is not limited thereto.

In an example, the first conductive pattern 650 and/or the second conductive pattern 660 may be electrically connected with the wireless communication circuit through an electric connection member (not shown). The electric connection member may include, for example, at least one of a signal wire, an FPCB, a conductive gasket, a conductive foam, or a C-clip, but is not limited thereto. Through the above-described electric connection relationship, the wireless communication circuit may transmit or feed an RF signal of a designated frequency band to the first conductive pattern 650 and/or the second conductive pattern 660. In an example, the first conductive pattern 650 may be fed from the wireless communication circuit at a third point $P_3$ and may operate as an antenna radiator to transmit and/or receive an RF signal of a first frequency band. The first frequency band may be a UWB frequency band (for example, about 6.25 GHz to about 8.75 GHz) which is substantially the same as or similar to the frequency band of the RF signal transmitted and/or received in the first conductive patch 610 and/or the second conductive patch 620. In another example, the second conductive pattern 660 may be fed from the wireless communication circuit and may operate as an antenna radiator to transmit and/or receive an RF signal of a second frequency band, which is different from the first frequency band. The second frequency band may be, for example, a frequency band of about 2.4 GHz or about 5 GHz (or a "Wi-Fi frequency band"), but is not limited thereto.

The electronic device 500 according to an embodiment may detect a position of an external electronic device (for example, the external electronic device 302 of FIG. 10A) by using the first conductive patch 610 and the second conductive patch 620 which are disposed on the flexible printed circuit board 600, and/or the first conductive pattern 650 disposed on the second support structure 550. In an example, the electronic device 500 may use any one antenna radiator from among the first conductive patch 610, the second conductive patch 620, and/or the first conductive pattern, which operates as an antenna radiator, as an antenna radiator to transmit and receive an RF signal of a UWB frequency band, and may use the other antenna radiator as an antenna radiator to receive an RF signal of a UWB frequency band. In an example, the electronic device 500 may use an antenna radiator that has a shortest distance between feeding positions from among the first conductive patch 610, the second conductive patch 620, and/or the first conductive pattern 650, which operates as an antenna radiator of a UWB frequency band, as an antenna radiator to transmit and a receive an RF signal of a designated frequency band. For example, a distance between the first point $P_1$ of the first conductive patch 610 and the third point $P_3$ of the first conductive pattern 650 may be shorter than a distance between the first point $P_1$ of the first conductive patch 610 and the second point $P_2$ which is a feeding position of the second conductive patch 620. In another example, the distance between the first point $P_1$ of the first conductive patch 610 and the second point $P_2$ of the second conductive patch 620 may be shorter than a distance between the second point $P_2$ of the second conductive patch 620 and the third point $P_3$ of the first conductive pattern 650. In the above-described case, the electronic device 500 may use the first conductive patch 610 which has the shortest distance between feeding positions as an antenna radiator to transmit and receive an RF signal of a designated frequency band, and may use the second conductive patch 620 and/or the first conductive pattern 650 as an antenna radiator to receive an RF signal of a designated frequency band. In an example, the electronic device 500 may transmit an RF signal including a position detection request message to the external electronic device by using the first conductive patch 610, and may receive an RF signal including a position detection response message from the external electronic device by using at least two of the first conductive patch 610, the second conductive patch 620, and/or the first conductive pattern 650. In another example, the electronic device 500 may detect a position of the external electronic device, based on the RF signal received from the external electronic device. For example, the electronic device 500 may detect the position of the external electronic device through operations 901 to 903 of FIG. 9 described above, and a redundant explanation thereof is omitted.

Figure 15:
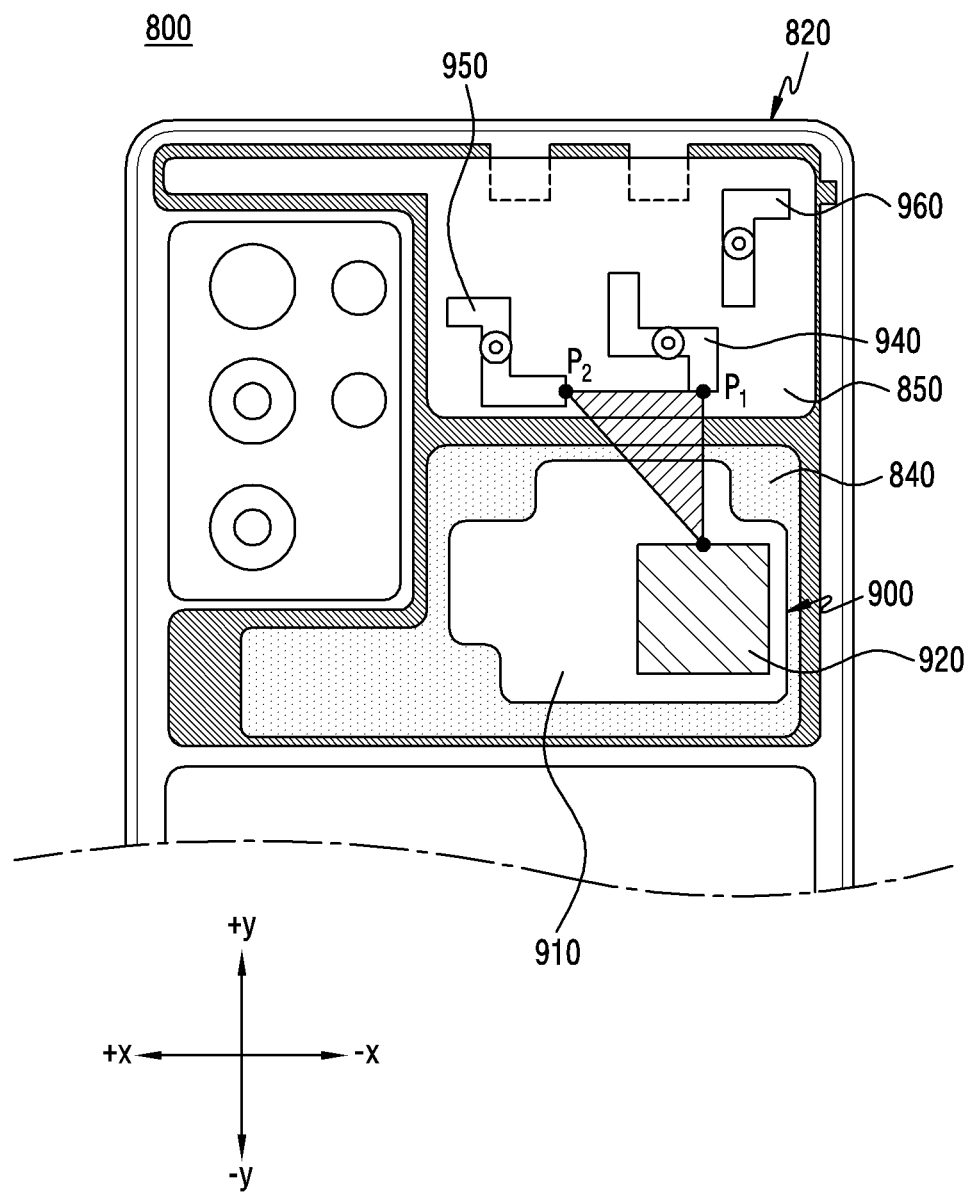
FIG. 15 is a view illustrating a first support structure, a second support structure, and an antenna radiator disposed on the first support structure and the second support structure according to an embodiment of the disclosure.

FIG. 15 is a view illustrating a first support structure, a second support structure, and an antenna radiator disposed on the first support structure and the second support structure in an electronic device according to an embodiment of the disclosure.

Referring to FIG. 15, the electronic device 800 according to an embodiment of the disclosure may include a side surface member 820 (for example, the side surface member 320 of FIG. 4), a printed circuit board 830 (for example, the at least one printed circuit board 330 of FIG. 4), a first support structure 840 (for example, the first support structure 340 of FIG. 4), a second support structure 850 (for example, the second support structure 350 of FIG. 4), a patch antenna 900, and/or at least one conductive pattern 940, 950, 960. At least one of the components of the electronic device 800 according to an embodiment may be the same as or similar to at least one of the components of the electronic device 300 of FIG. 4, and a redundant explanation thereof is omitted.

According to an embodiment of the disclosure, the at least one conductive pattern 940, 950, 960 may be disposed on at least one area of the second support structure 850. In an example, the at least one conductive pattern 940, 950, 960 may include a first conductive pattern 940, a second conductive pattern 950 which is spaced apart from the first conductive pattern 940 by a designated distance, and/or a third conductive pattern 960 which is spaced apart from the first conductive pattern 940, the second conductive pattern 950. In an example, the first conductive pattern 940, the second conductive pattern 950, and/or the third conductive pattern 960 may be electrically connected with a wireless communication circuit (not shown) (for example, the wireless communication module 192 of FIG. 1) disposed on the printed circuit board 830 through an electric connection member (not shown). The electric connection member may include, for example, at least one of a signal wire, an FPCB, a C-clip, a conductive gasket, or a conductive foam, but is not limited thereto. Through the above-described electric connection relationship, the first conductive pattern 940, the second conductive pattern 950, and/or the third conductive pattern 960 may operate as an antenna radiator to transmit and/or receive an RF signal of a designated frequency band. In an example, the first conductive pattern 90 may be fed from the wireless communication circuit at a first point $P_1$, and may operate as an antenna radiator to transmit and/or receive an RF signal of a first frequency band. In another example, the second conductive pattern 950 may be fed from the wireless communication circuit at a second point $P_2$, and may operate as an antenna radiator to transmit and/or receive the RF signal of the first frequency band which is substantially the same as the first conductive pattern 940. In still another example, the third conductive pattern 960 may be fed from the wireless communication circuit, and may operate as an antenna radiator to transmit and/or receive an RF signal of a second frequency band which is different from the first frequency band. For example, the first frequency band may be a UWB frequency band (for example, a frequency band of about 6.25 GHz to about 8.75 GHz), and the second frequency band may be a frequency band of about 2.4 GHz and/or about 5 GHz.

According to an embodiment of the disclosure, the patch antenna 900 may be disposed on at least one area of the first support structure 840 adjacent to the second support structure 850. In an example, the patch antenna 900 may include a flexible printed circuit board 910 including a plurality of layers, and/or a conductive patch 920 disposed on at least one area of the flexible printed circuit board 910. For example, the flexible printed circuit board 910 may include a first layer (for example, the first layer 411 of FIG. 6A) on which the conductive patch 920 is disposed, a second layer (for example, the second layer 412 of FIG. 6A) including a ground, and/or a dielectric disposed between the first layer and the second layer. In an example, the conductive patch 920 may be electrically connected with the wireless communication circuit through an electric connection member (not shown). The electric connection member may include, for example, at least one of a signal wire, an FPCB, a C-clip, a conductive gasket, or a conductive foam, but is not limited thereto. In an example, the conductive patch 920 may be fed from the wireless communication circuit at a third point $P_3$, and may operate as an antenna radiator to transmit and/or receive an RF signal of a designated frequency band. For example, the conductive patch 920 may operate as an antenna radiator to transmit and/or receive an RF signal of a first frequency band (for example, a UWB frequency band) substantially the same as or similarly to the first conductive pattern 940, the second conductive pattern 950.

The electronic device 800 according to an embodiment may detect a position of an external electronic device (for example, the external electronic device 302 of FIG. 10A) by using the conductive patch 920 disposed on the first support structure 840 and the first conductive pattern 940, the second conductive pattern 950 disposed on the second support structure 850.

In an example, the electronic device 800 may use any one antenna radiator from among the conductive patch 920, the first conductive pattern 940, and/or the second conductive pattern 950 which operates as an antenna radiator, as an antenna radiator to transmit and receive an RF signal of a UWB frequency band, and may use the other antenna radiator as an antenna radiator to receive an RF signal of a UWB frequency band. In an example, the electronic device 800 may use an antenna radiator that has a shortest distance between feeding positions, from among the conductive patch 920, the first conductive pattern 940, and/or the second conductive pattern 950, which operates as an antenna radiator, as an antenna radiator to transmit and receive an RF signal of a UWB frequency band. For example, a distance between the first point $P_1$ which is a feeding position of the first conductive pattern 940 and a second point $P_2$ which is a feeding position of the second conductive pattern 950 may be shorter than a distance between the first point $P_1$ of the first conductive pattern 940 and the third point $P_3$ which is a feeding position of the conductive patch 920. In another example, the distance between the first point $P_1$ of the first conductive pattern 940 and the third point $P_3$ of the conductive patch 920 may be shorter than a distance between the second point $P_2$ of the second conductive pattern 950 and the third point $P_3$ of the conductive patch 920. In the above-described case, the electronic device 800 may use the first conductive pattern 940 that has the shortest distance between feeding positions as an antenna radiator to transmit and receive an RF signal of a UWB frequency band, and may use the conductive patch 920 and/or the second conductive pattern 950 as an antenna radiator to receive an RF signal of a UWB frequency band. In an example, the conductive patch 920, the first conductive pattern 940, and/or the second conductive pattern 950 may be disposed to be spaced apart from one another by designated distances to guarantee isolation. In another example, the conductive patch 920, the first conductive pattern 940, and/or the second conductive pattern 950 may be disposed to be spaced apart from one another by the designated distances, but may be disposed such that a distance between feeding positions (for example, the first point $P_1$, the second point $P_2$, and/or the third point $P_3$) of the conductive patch 920, the first conductive pattern 940, and/or the second conductive pattern 950 is less than or equal to a distance of a half wavelength ($\lambda/2$) of an RF signal transmitted and/or received through the conductive patch 920, the first conductive pattern 940, and/or the second conductive pattern 950. In an example, through the above-described arrangement structure, the electronic device 800 may use the conductive patch 920, the first conductive pattern 940, and/or the second conductive pattern 950 as an antenna radiator to detect a position of an external electronic device.

According to an embodiment of the disclosure, the electronic device 800 may transmit an RF signal including a position detection request message to the external electronic device by using the first conductive pattern 940, and may receive an RF signal including a position detection response message from the external electronic device by using at least two of the conductive patch 920, the first conductive pattern 940 or the second conductive pattern 950. For example, the electronic device 800 may receive the RF signal including the position detection response message from the external electronic device by using the first conductive pattern 940 and the second conductive pattern 950. In another example, the electronic device 800 may detect a position of the external electronic device, based on the RF signal received from the external electronic device. For example, the electronic device 800 may detect the position of the external electronic device through operations 901 to 903 of FIG. 9 described above, and a redundant explanation thereof is omitted. In another example, the electronic device 800 may detect the position of the external electronic device by using at least two of the conductive patch 920, the first conductive pattern 940, or the second conductive pattern 950 according to a current posture of the electronic device 800. For example, when the current posture of the electronic device 800 is in the portrait state (for example, see FIG. 12A), the electronic device 800 may detect the position of the external electronic device by using the first conductive pattern 940 and the second conductive pattern 950. In another example, when the current posture of the electronic device 800 is in the landscape state (for example, see FIG. 13A), the electronic device 800 may detect the position of the external electronic device by using the first conductive pattern 940 and the conductive patch 920.

For example, compared to the electronic device 300 of FIG. 4 which detects a position of an external electronic device by using at least two conductive patches (for example, the first conductive patch 420, the second conductive patch 430 of FIG. 4) and at least one conductive pattern (for example, the conductive pattern 450 of FIG. 4), the electronic device 800 according to an embodiment may detect a position of an external electronic device by using at least two conductive patterns (for example, the first conductive pattern 940, the second conductive pattern 950) and/or at least one conductive patch (for example, the conductive patch 920).

Figure 16:
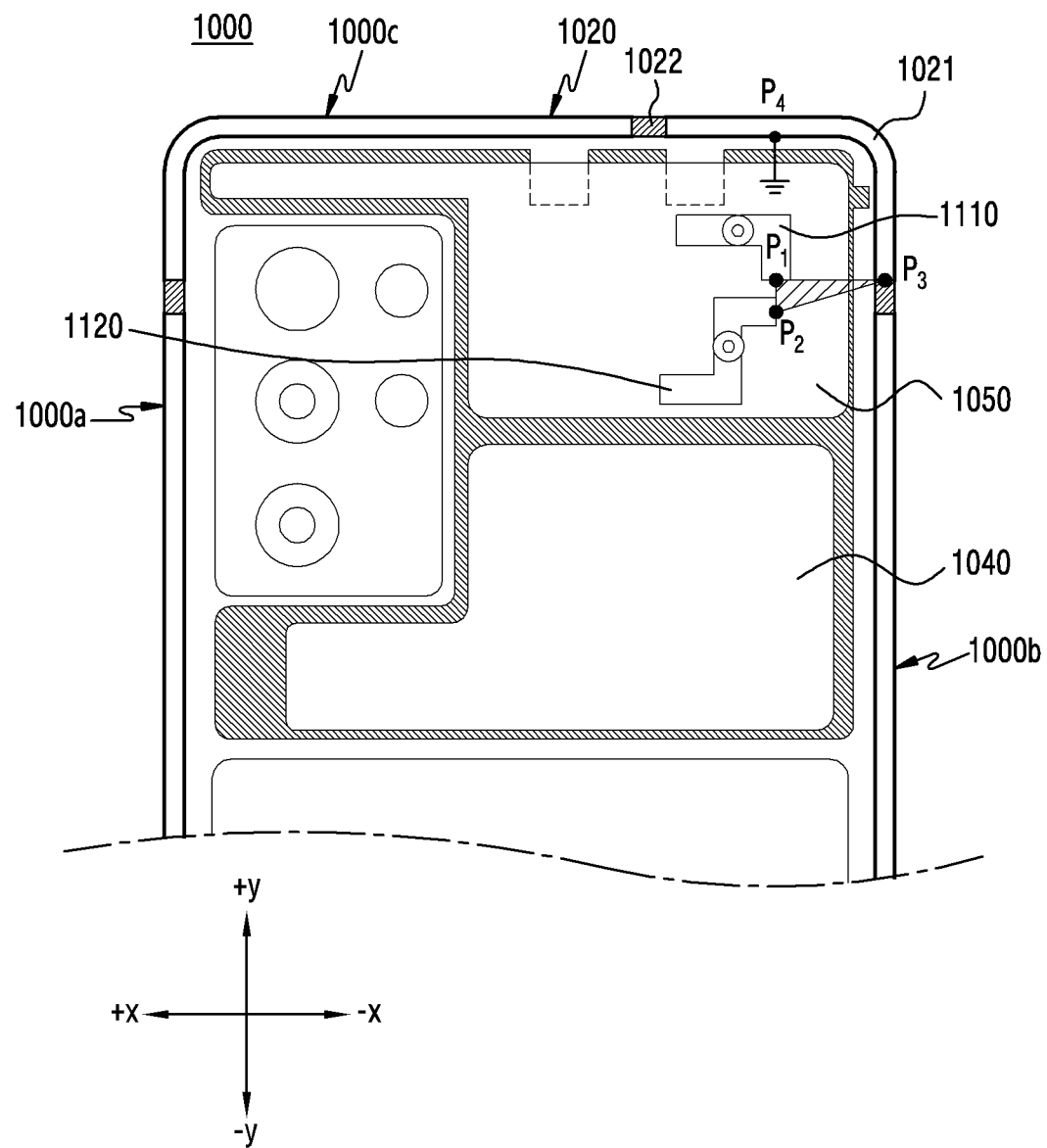
FIG. 16 is a view illustrating an antenna radiator disposed on a second support structure of an electronic and a conductive portion of a side surface member according to an embodiment of the disclosure.

FIG. 16 is a view illustrating an antenna radiator disposed on a second support structure of an electronic device and a conductive portion of a side surface member according to an embodiment of the disclosure.

Referring to FIG. 16, the electronic device 1000 according to an embodiment may include a side surface member 1020 (for example, the side surface member 320 of FIG. 4), a printed circuit board 1030 (for example, the at least one printed circuit board 330 of FIG. 4), a first support structure 1040 (for example, the first support structure 340 of FIG. 4), a second support structure 1050 (for example, the second support structure 350 of FIG. 4), a first conductive pattern 1110, and/or a second conductive pattern 1120. At least one of the components of the electronic device 1000 according to an embodiment may be the same as or similar to at least one of the components of the electronic device 300 of FIG. 4, and a redundant explanation thereof is omitted.

According to an embodiment of the disclosure, the first conductive pattern 1110 and the second conductive pattern 1120 may be disposed on at least one area of the second support structure 1050 formed with a nonconductive material (for example, plastic, polymer). In an example, the first conductive pattern 1110 may be disposed to be spaced apart from the second conductive pattern 1120 by a designated distance. In another example, the first conductive pattern 1110 and/or the second conductive pattern 1120 may be electrically connected with a wireless communication circuit (not shown) (for example, the wireless communication module 192 of FIG. 1) of the printed circuit board 1030, and may operate as an antenna radiator to transmit and/or receive an RF signal of a designated frequency band. In an example, the first conductive pattern 1110 may be fed from the wireless communication circuit at a first point $P_1$, and may operate as an antenna radiator to transmit and/or receive an RF signal of a designated frequency band. In another example, the second conductive pattern 1120 may be fed from the wireless communication circuit at a second point $P_2$ which is spaced apart from the first point $P_1$, and may operate as an antenna radiator to transmit and/or receive an RF signal of a designated frequency band. For example, the first conductive pattern 1110 and/or the second conductive pattern 1120 may operate as an antenna radiator to transmit and/or receive an RF signal of a UWB frequency band (for example, about 6.25 GHz to about 8.75 GHz), but is not limited thereto.

According to an embodiment of the disclosure, the side surface member 1020 may form a side surface (for example, the side surface 210C of FIG. 2A) of the electronic device 1000, and may form a space to have the components (for example, the printed circuit board 1030) of the electronic device 1000 disposed therein. In an example, the side surface member 1020 may form a first side surface 1000*a* (for example, the first side surface 300*a* of FIG. 12A) which is extended along a first direction (for example, the +y direction of FIG. 16), a second side surface 1000*b* (for example, the second side surface 300*b* of FIG. 12A) which is parallel to the first side surface 1000*a*, a third side surface 1000*c* (for example, the third side surface 300*c* of FIG. 12A) which is extended along a second direction (for example, the +x direction of FIG. 16) perpendicular to the first direction, and connects one end (for example, one end in the +y direction of FIG. 16) of the first side surface 1000*a* and one end (for example, one end in the +y direction of FIG. 16) of the second side surface 1000*b*, and/or a fourth side surface (not shown) (for example, the fourth side surface 300*d* of FIG. 12A) which is parallel to the third side surface 1000*c* and connects the other end (for example, one end in the −y direction of FIG. 16) of the first side surface 1000*a* and the other end (for example, one end in the −y direction of FIG. 16) of the second side surface 1000*b*.

In an example, the side surface member 1020 may include at least one conductive portion and/or at least one nonconductive portion which is disposed on the above-described side surface (for example, the first side surface 1000*a*, the second side surface 1000*b*, or the third side surface 1000*c*) of the electronic device 1000. In an example, the side surface member 1020 may include a first conductive portion 1021 disposed between the second side surface 1000*b* and the third side surface 1000*c*, a first nonconductive portion 1022 disposed on one end (for example, one end in the +x direction of FIG. 16) of the first conductive portion 1021, and a second nonconductive portion 1023 disposed on the other end (for example, one end in the −y direction of FIG. 16) of the first conductive portion 1021. In another example, the first nonconductive portion 1022 and/or the second nonconductive portion 1023 may be disposed on both ends of the first conductive portion 1021 to insulate the first conductive portion 1021. In an example, the first conductive portion 1021 of the side surface member 1020 may be electrically connected with a wireless communication circuit of the printed circuit board 1030, and may operate as an antenna radiator to transmit and/or receive an RF signal of a designated frequency band. For example, the first conductive portion 1021 of the side surface member 1020 may be fed from the wireless communication circuit at a third point $P_3$ which is spaced apart from the first point $P_1$ and/or the second point $P_2$, and may be grounded to a ground of the printed circuit board 1030 at a fourth point $P_4$. In an example, the third point $P_3$ may be formed adjacent to the second nonconductive portion 1023, and the fourth point $P_4$ may be formed adjacent to the first nonconductive portion 1022, but this should not be considered as limiting. In an example, the first conductive portion 1021 of the side surface member 1020 may operate as an antenna radiator to transmit and/or receive an IF signal of the same frequency band (for example, the UWB frequency band) as in the first conductive pattern 1110 and/or the second conductive pattern 1120.

According to an embodiment of the disclosure, the electronic device 1000 may detect a position of an external electronic device (for example, the electronic device 302 of FIG. 10A) by using the first conductive pattern 1110, the second conductive pattern 1120, and/or the first conductive portion 1021 of the side surface member 1020 which operates as an antenna radiator.

In an example, the electronic device 1000 may use any one antenna radiator from among the first conductive pattern 1110, the second conductive pattern 1120, and/or the first conductive portion 1021 of the side surface member 1020, which operates as an antenna radiator, as an antenna radiator to transmit and receive an RF signal of a UWB frequency band, and may use the other antenna radiator as an antenna radiator to receive an RF signal of a UWB frequency band. In an example, the electronic device 1000 may use an antenna radiator that has a shortest distance between feeding positions, from among the first conductive pattern 1110, the second conductive pattern 1120, and/or the first conductive portion 1021 of the side surface member 1020 which operates as an antenna radiator, as an antenna radiator to transmit and receive an RF signal of a UWB frequency band. For example, a distance between the first point $P_1$ which is a feeding position of the first conductive pattern 1110 and the second point $P_2$ which is a feeding position of the second conductive pattern 1120 may be shorter than a distance between the first point $P_1$ of the first conductive pattern 1110 and the third point $P_3$ which is a feeding position of the first conductive portion 1021. In another example, the distance between the first point $P_1$ of the first conductive pattern 1110 and the third point $P_3$ of the first conductive portion 1021 may be shorter than a distance between the second point $P_2$ of the second conductive pattern 1120 and the third point $P_3$ of the first conductive portion 1021. In the above-described case, the electronic device 1000 may use the first conductive pattern 1110 that has the shorter distance between feeding positions as an antenna radiator to transmit and receive an RF signal of a UWB frequency band, and may use the second conductive pattern 1120 and/or the first conductive portion 1021 of the side surface member 1020 as an antenna radiator to receive an RF signal of a UWB frequency band. In an example, the first conductive pattern 1110, the second conductive pattern 1120, and/or the first conductive portion 1021 of the side surface member 1020 may be disposed to be spaced apart from one another by designated distances to guarantee isolation. In another example, the first conductive pattern 1110, the second conductive pattern 1120, and/or the first conductive portion 1021 of the side surface member 1020 may be disposed to be spaced apart from one another by designated distances, but may be disposed such that a distance between the feeding positions (for example, the first point $P_1$, the second point $P_2$, and/or the third point $P_3$) of the first conductive pattern 1110, the second conductive pattern 1120, and/or the first conductive portion 1021 of the side surface member 1020 is less than or equal to a half wavelength ($\lambda/2$) distance of an RF signal transmitted and/or received through the first conductive pattern 1110, the second conductive pattern 1120, and/or the first conductive portion 1021 of the side surface member 1020. In an example, through the above-described arrangement structure, the electronic device 1000 may use the first conductive pattern 1110, the second conductive pattern 1120, and/or the first conductive portion 1021 of the side surface member 1020 as an antenna radiator to detect a position of an external electronic device.

According to an embodiment of the disclosure, the electronic device 1000 may transmit an RF signal including a position detection request message to the external electronic device by using the first conductive pattern 1110, and may receive an RF signal including a position detection response message from the external electronic device by using at least two of the first conductive pattern 1110, the second conductive pattern 1120, or the first conductive portion 1021 of the side surface member 1020. For example, the electronic device 1000 may receive the RF signal including the position detection response message from the external electronic device by using the first conductive pattern 1110 and the first conductive portion 1021 of the side surface member 1020. In another example, the electronic device 1000 may detect the position of the external electronic device, based on the RF signal received from the external electronic device. For example, the electronic device 1000 may detect the position of the external electronic device through operations 901 to 903 of FIG. 9 described above, and a redundant explanation thereof is omitted. In another example, the electronic device 1000 may detect the position of the external electronic device by using at least two of the first conductive pattern 1110, the second conductive pattern 1120, or the first conductive portion 1021 of the side surface member 1020, according to a current posture state of the electronic device 1000. For example, when the current posture of the electronic device 1000 is in the portrait state (for example, see FIG. 12A), the electronic device 1000 may detect the position of the external electronic device by using the first conductive pattern 1110 and the first conductive portion 1021 of the side surface member 1020. In another example, when the current posture of the electronic device 1000 is in the landscape state (for example, see FIG. 13A), the electronic device 1000 may detect the position of the external electronic device by using the first conductive pattern 1110 and the second conductive pattern 1120.

For example, compared to the electronic device (for example, the electronic device 300 of FIG. 4 or the electronic device 800 of FIG. 15) according to the above-described embodiments of the disclosure, the electronic device 1000 according to an embodiment may detect a position of an external electronic device by using some areas (for example, the first conductive portion 1021) of the side surface member 1020 and/or at least two conductive patterns (for example, the first conductive pattern 1110, the second conductive pattern 1120) disposed on the second support structure 1050.

According to an embodiment of the disclosure, an electronic device (for example, the electronic device 200 of FIGS. 2A, 2B, and/or the electronic device 300 of FIG. 3) may include a housing including a front surface plate (for example, the front surface plate 202 of FIG. 2A) forming a front surface (for example, the first surface 210A of FIG. 2A) of the electronic device, a rear surface plate (for example, the rear surface plate 211 of FIG. 2B) forming a rear surface (for example, the second surface 210B of FIG. 2B) of the electronic device, and a side surface member (for example, the side surface member 320 of FIG. 3) forming a side surface of the electronic device, a printed circuit board (for example, the at least one printed circuit board 330 of FIG. 3) positioned within the housing and having at least one electronic component (for example, the at least one electronic component 334a, 334b, 334c of FIGS. 4 and 5) disposed thereon, a first support structure (for example, the first support structure 340 of FIG. 4) positioned between the printed circuit board and the rear surface plate, and formed with a conductive material, a second support structure (for example, the second support structure 350 of FIG. 4) disposed adjacent to the first support structure and formed with a nonconductive material, a patch antenna (for example, the patch antenna 400) including a flexible printed circuit board (for example, the flexible printed circuit board 410 of FIG. 4) disposed on one surface of the first support structure that faces the rear surface plate, a first conductive patch (for example, the first conductive patch 420 of FIG. 4) disposed on the flexible printed circuit board, and a second conductive patch (for example, the second conductive patch 430 of FIG. 4) disposed to be spaced apart from the first conductive patch, a conductive pattern (for example, the conductive pattern 450 of FIG. 4) disposed on one surface of the second support structure that faces the rear surface plate, and a wireless communication circuit (for example, the wireless communication circuit 471 of FIGS. 12A, 12B, 13A, and/or 13B) electrically connected with the first conductive patch, the second conductive patch, and the conductive pattern, and the first conductive patch may be fed from the wireless communication circuit at a first point (for example, $P_1$ of FIG. 4), the second conductive patch may be fed from the wireless communication circuit at a second point (for example, $P_2$ of FIG. 4), and the conductive pattern may be fed from the wireless communication circuit at a third point (for example, $P_3$ of FIG. 4).

In an example, the first conductive patch, the second conductive patch, and the conductive pattern may operate as antenna radiators, an antenna radiator that has a smallest sum of distances between feeding points with respect to the other antenna radiators, from among the first conductive patch, the second conductive patch, and the conductive pattern, may operate as an antenna radiator to transmit or receive an RF signal of a designated frequency band, and the other antenna radiators may operate as antenna radiators to receive an RF signal of a designated frequency band.

In an example, the first conductive patch may operate as an antenna radiator to transmit or receive the RF signal of the designated frequency band, and the second conductive patch and the conductive pattern may operate as antenna radiator to receive the RF signal of the designated frequency band.

In an example, the wireless communication circuit may receive the RF signal of the designated frequency band from at least one external electronic device through the first conductive patch, the second conductive patch, and the conductive pattern.

In an example, the electronic device may further include a processor (for example, the processor 480 of FIGS. 12A, 12B, 13A, and/or 13B) electrically connected with the wireless communication circuit, and the processor may be configured to transmit an RF signal to at least one external electronic device by using the first conductive patch, receive an RF signal from the at least one external electronic device by using the first conductive patch and the second conductive patch or the conductive pattern, and determine a position of the at least one external electronic device, based on the RF signal received from the at least one external electronic device.

In an example, the processor may be configured to identify an AOA and an RTT of the RF signal received from the at least one external electronic device, and determine the position of the at least one external electronic device, based on the AOA and the RTT of the RF signal which are identified.

In an example, the electronic device may further include at least one sensor (for example, the at least one sensor 490 of FIGS. 12A, 12B, 13A, and/or 13B) to detect a posture of the electronic device, and the processor may be configured to detect a posture of the electronic device through the at least one sensor, when the detected posture of the electronic device is in a portrait state (for example, see FIG. 12A), determine the position of the at least one external electronic device, based on an RF signal received from the at least one external electronic device through the first conductive patch and the second conductive patch, and, when the detected posture of the electronic device is in a landscape state (for example, see FIG. 13A), determine the position of the at least one external electronic device, based on an RF signal received from the at least one external electronic device through the first conductive patch and the conductive pattern.

In an example, the first point and the second point, the second point and the third point, and the first point and the third point may be disposed to be spaced apart from each other by a designated distance.

In an example, the designated distance may be less than or equal to a half wavelength (λ/2) distance of the RF signal.

In an example, the first support structure may be formed to have a first height (for example, h₁ of FIG. 5), the second support structure may be formed to have a second height (for example, h₂ of FIG. 5) which is higher than the first height, and the patch antenna may be formed to have a thickness (for example, T of FIG. 5) corresponding to a difference between the second height and the first height.

In an example, the first support structure may further include a recess (for example, R of FIG. 7) which is depressed from the one surface of the first support structure that faces the rear surface plate in a direction toward the printed circuit board, and the patch antenna may be disposed within the recess.

In an example, the flexible printed circuit board of the patch antenna may include a first layer (for example, the first layer 411 of FIG. 6A) on which the first conductive patch and the second conductive patch are disposed, a second layer (for example, the second layer 412 of FIG. 6A) including a ground, at least one electric connection member (for example, the signal wire 421, 431 of FIG. 6A) to electrically connect the first conductive patch and the second conductive patch with the wireless communication circuit, and a conductive via (for example, the electric connection member 415, 416 of FIG. 6B) to electrically connect the first conductive patch and the second conductive patch of the first layer with the ground of the second layer.

In an example, the patch antenna may further include a guard ground (for example, the guard ground 4111 of FIG. 6A) disposed on the first layer and including at least one groove (for example, the at least one groove 4111a of FIG. 6A), and the first conductive patch and the second conductive patch may be disposed within the at least one groove.

In an example, the flexible printed circuit board of the patch antenna may include a first layer (for example, the first layer 411 of FIG. 6C) on which the first conductive patch and the second conductive patch are disposed, a second layer (for example, the second layer 412 of FIG. 6C) on which at least one electric connection member to electrically connect the first conductive patch and the second conductive patch with the wireless communication circuit is disposed, and a third layer (for example, the third layer 413 of FIG. 6C) including a ground.

In an example, the patch antenna may further include a first guard ground (for example, the first guard ground 4111 of FIG. 6C) disposed on the first layer and including at least one first groove (for example, the at least one groove 4111a, 4111b of FIG. 6C), and a second guard ground (for example, the second guard ground 4121 of FIG. 6C) disposed on the second layer and including at least one second groove (for example, the at least one groove 4121a, 4121b of FIG. 6C), and the first conductive patch and the second conductive patch may be disposed within the at least one first groove, and the at least one electric connection member may be disposed within the at least one second groove.

According to another embodiment of the disclosure, an electronic device (for example, the electronic device 200 of FIGS. 2A, 2B and/or the electronic device 800 of FIG. 15) may include a housing including a front surface plate (for example, the front surface plate 202 of FIG. 2A) forming a front surface (for example, the first surface 210A of FIG. 2A) of the electronic device, a rear surface plate (for example, the rear surface plate 211 of FIG. 2B) forming a rear surface (for example, the second surface 210B of FIG. 2B) of the electronic device, and a side surface member (for example, the side surface member 320 of FIG. 3) forming a side surface of the electronic device, a printed circuit board (for example, the printed circuit board 830 of FIG. 15) positioned within the housing and having at least one electronic component (for example, the at least one electronic component 334a, 334b, 334c of FIGS. 4 and 5) disposed thereon, a first support structure (for example, the first support structure 840 of FIG. 15) positioned between the printed circuit board and the rear surface plate, and formed with a conductive material, a second support structure (for example, the second support structure 350 of FIG. 15) disposed adjacent to the first support structure and formed with a nonconductive material, a patch antenna (for example, the patch antenna 900 of FIG. 15) including a flexible printed circuit board (for example, the flexible printed circuit board 910 of FIG. 15) disposed on one surface of the first support structure that faces the rear surface plate, and a conductive patch (for example, the conductive patch 920 of FIG. 15) disposed on the flexible printed circuit board, a first conductive pattern (for example, the first conductive pattern 940 of FIG. 15) disposed on one surface of the second support structure that faces the rear surface plate, a second conductive pattern (for example, the second conductive pattern 950 of FIG. 15) disposed on the one surface of the second support structure that faces the rear surface plate, and disposed to be spaced apart from the first conductive pattern, and a wireless communication circuit (for example, the wireless communication module 192 of FIG. 1) electrically connected with the conductive patch, the first conductive pattern and the second conductive pattern, and the conductive patch may be fed from the wireless communication circuit at a first point (for example, $P_3$ of FIG. 15), the first conductive pattern may be fed from the wireless communication circuit at a second point (for example, $P_1$ of FIG. 15), and the second conductive pattern may be fed from the wireless communication circuit at a third point (for example, $P_2$ of FIG. 15).

In an example, the first conductive pattern may operate as an antenna radiator to transmit an RF signal of a first frequency band to at least one external electronic device, or to receive the RF signal of the first frequency band from the at least one external electronic device, and the second conductive pattern and the conductive patch may operate as antenna radiators to receive the RF signal of the first frequency band from the at least one external electronic device.

In an example, the electronic device may further include a third conductive pattern (for example, the third conductive pattern 960 of FIG. 15) disposed on the one surface of the second support structure that faces the rear surface plate, and electrically connected with the wireless communication circuit.

In an example, the third conductive pattern may operate as an antenna radiator to transmit or receive an RF signal of a second frequency band which is different from the first frequency band.

According to still another embodiment of the disclosure, an electronic device (for example, the electronic device 200 of FIGS. 2A, 2B and/or the electronic device 800 of FIG. 15) may include a housing including a front surface plate (for example, the front surface plate 202 of FIG. 2A) forming a front surface (for example, the first surface 210A of FIG. 2A) of the electronic device, a rear surface plate (for example, the rear surface plate 211 of FIG. 2B) forming a rear surface (for example, the second surface 210B of FIG. 2B) of the electronic device, and a side surface member (for example, the side surface member 320 of FIG. 3, the side surface member 1020 of FIG. 16) forming a side surface of the electronic device, the side surface member of the housing including a first conductive portion (for example, the first conductive portion 1021 of FIG. 16), a first nonconductive portion (for example, the first nonconductive portion 1022 of FIG. 16) disposed on one end of the first conductive portion, and a second nonconductive portion (for example, the second nonconductive portion 1023) disposed on the other end of the first conductive portion, a support structure (for example, the second support structure 1050 of FIG. 16) disposed adjacent to the first support structure and formed with a nonconductive material, a first conductive pattern (for example, the first conductive pattern 1110 of FIG. 16) disposed on one surface of the support structure that faces the rear surface plate, a second conductive pattern (for example, the second conductive pattern 1120 of FIG. 16) disposed on the one surface of the support structure that faces the rear surface plate and disposed to be spaced apart from the first conductive pattern, a printed circuit board (for example, the printed circuit board 1030 of FIG. 16) positioned within the housing and including a ground, and a wireless communication circuit (for example, the wireless communication module 192 of FIG. 1) disposed on the printed circuit board, and electrically connected with the first conductive portion of the side surface member, the first conductive pattern, and the second conductive pattern, and the first conductive pattern may be fed from the wireless communication circuit at a first point (for example, $P_1$ of FIG. 16), the second conductive pattern may be fed from the wireless communication circuit at a second point (for example, $P_2$ of FIG. 16), the first conductive portion of the side surface member may be fed from the wireless communication circuit at a third point (for example, $P_3$ of FIG. 16), and is grounded to the ground of the printed circuit board at a fourth point (for example, $P_4$ of FIG. 16), which is spaced apart from the third point.

The electronic device according to an embodiment of the disclosure can measure an AOA of a signal (for example, an RF signal) received in all direction of the electronic device.

The electronic device according to an embodiment of the disclosure can detect a position of an external electronic device through UWB communication technology.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
 a housing comprising:
  a front surface plate forming a front surface of the electronic device,
  a rear surface plate forming a rear surface of the electronic device, and
  a side surface member forming a side surface of the electronic device;
 a printed circuit board positioned within the housing and having at least one electronic component disposed thereon;
 a first support structure positioned between the printed circuit board and the rear surface plate, and formed with a conductive material;
 a second support structure disposed adjacent to the first support structure and formed with a nonconductive material;
 a patch antenna comprising:
  a flexible printed circuit board disposed on one surface of the first support structure that faces the rear surface plate,
  a first conductive patch disposed on the flexible printed circuit board, and
  a second conductive patch disposed to be spaced apart from the first conductive patch;

a conductive pattern disposed on one surface of the second support structure that faces the rear surface plate; and
a wireless communication circuit electrically connected with the first conductive patch, the second conductive patch, and the conductive pattern,
wherein the first conductive patch is fed from the wireless communication circuit at a first point,
wherein the second conductive patch is fed from the wireless communication circuit at a second point, and
wherein the conductive pattern is fed from the wireless communication circuit at a third point.

2. The electronic device of claim 1,
wherein the first conductive patch, the second conductive patch, and the conductive pattern are configured to operate as antenna radiators,
wherein an antenna radiator that has a smallest sum of distances between feeding points with respect to the other antenna radiators, from among the first conductive patch, the second conductive patch, and the conductive pattern, is configured to operate as an antenna radiator to transmit or receive a radio frequency (RF) signal of a designated frequency band, and
wherein the other antenna radiators are configured to operate as antenna radiators to receive an RF signal of a designated frequency band.

3. The electronic device of claim 2,
wherein the first conductive patch is configured to operate as an antenna radiator to transmit or receive the RF signal of the designated frequency band, and
wherein the second conductive patch and the conductive pattern are configured to operate as antenna radiators to receive the RF signal of the designated frequency band.

4. The electronic device of claim 3, wherein the wireless communication circuit is configured to receive the RF signal of the designated frequency band from at least one external electronic device through the first conductive patch, the second conductive patch, and the conductive pattern.

5. The electronic device of claim 3, further comprising a processor electrically connected with the wireless communication circuit,
wherein the processor is configured to:
 transmit an RF signal to at least one external electronic device by using the first conductive patch,
 receive an RF signal from the at least one external electronic device by using the first conductive patch and the second conductive patch or the conductive pattern, and
 determine a position of the at least one external electronic device, based on the RF signal received from the at least one external electronic device.

6. The electronic device of claim 5, wherein the processor is further configured to:
 identify an angle of arrival (AOA) and a round trip time (RTT) of the RF signal received from the at least one external electronic device, and
 determine the position of the at least one external electronic device, based on the AOA and the RTT of the RF signal which are identified.

7. The electronic device of claim 5, further comprising at least one sensor configured to detect a posture of the electronic device,
wherein the processor is further configured to:
 detect a posture of the electronic device through the at least one sensor,
 when the detected posture of the electronic device is in a portrait state, determine the position of the at least one external electronic device, based on an RF signal received from the at least one external electronic device through the first conductive patch and the second conductive patch, and
 when the detected posture of the electronic device is in a landscape state, determine the position of the at least one external electronic device, based on an RF signal received from the at least one external electronic device through the first conductive patch and the conductive pattern.

8. The electronic device of claim 1, wherein the first point and the second point, the second point and the third point, and the first point and the third point are disposed to be spaced apart from each other by a designated distance.

9. The electronic device of claim 8, wherein the designated distance is less than or equal to a half wavelength ($\lambda/2$) distance of the RF signal.

10. The electronic device of claim 1,
wherein the first support structure is formed to have a first height,
wherein the second support structure is formed to have a second height which is higher than the first height, and
wherein the patch antenna is formed to have a thickness corresponding to a difference between the second height and the first height.

11. The electronic device of claim 10,
wherein the first support structure further comprises a recess which is depressed from the one surface of the first support structure that faces the rear surface plate in a direction toward the printed circuit board, and
wherein the patch antenna is disposed within the recess.

12. The electronic device of claim 1, wherein the flexible printed circuit board of the patch antenna comprises:
 a first layer on which the first conductive patch and the second conductive patch are disposed;
 a second layer comprising a ground;
 at least one electric connection member configured to electrically connect the first conductive patch and the second conductive patch with the wireless communication circuit; and
 a conductive via configured to electrically connect the first conductive patch and the second conductive patch of the first layer with the ground of the second layer.

13. The electronic device of claim 12,
wherein the patch antenna further comprises a guard ground disposed on the first layer and comprising at least one groove, and
wherein the first conductive patch and the second conductive patch are disposed within the at least one groove.

14. The electronic device of claim 1, wherein the flexible printed circuit board of the patch antenna comprises:
 a first layer on which the first conductive patch and the second conductive patch are disposed;
 a second layer on which at least one electric connection member to electrically connect the first conductive patch and the second conductive patch with the wireless communication circuit is disposed; and
 a third layer comprising a ground.

15. The electronic device of claim 14,
wherein the patch antenna further comprises a first guard ground disposed on the first layer and comprising at least one first groove; and a second guard ground disposed on the second layer and comprising at least one second groove, wherein the first conductive patch and the second conductive patch are disposed within the at least one first groove, and
wherein the at least one electric connection member is disposed within the at least one second groove.

16. An electronic device comprising:
a housing comprising:
   a front surface plate forming a front surface of the electronic device,
   a rear surface plate forming a rear surface of the electronic device, and
   a side surface member forming a side surface of the electronic device;
a printed circuit board positioned within the housing and having at least one electronic component disposed thereon;
a first support structure positioned between the printed circuit board and the rear surface plate, and formed with a conductive material;
a second support structure disposed adjacent to the first support structure and formed with a nonconductive material;
a patch antenna comprising:
   a flexible printed circuit board disposed on one surface of the first support structure that faces the rear surface plate, and
   a conductive patch disposed on the flexible printed circuit board;
a first conductive pattern disposed on one surface of the second support structure that faces the rear surface plate;
a second conductive pattern disposed on the one surface of the second support structure that faces the rear surface plate, and disposed to be spaced apart from the first conductive pattern; and
a wireless communication circuit electrically connected with the conductive patch, the first conductive pattern and the second conductive pattern,
wherein the conductive patch is fed from the wireless communication circuit at a first point,
wherein the first conductive pattern is fed from the wireless communication circuit at a second point, and
wherein the second conductive pattern is fed from the wireless communication circuit at a third point.

17. The electronic device of claim 16,
wherein the first conductive pattern is configured to:
   operate as an antenna radiator to transmit a radio frequency (RF) signal of a first frequency band to at least one external electronic device, or
   receive the RF signal of the first frequency band from the at least one external electronic device, and
wherein the second conductive pattern and the conductive patch are configured to operate as antenna radiators to receive the RF signal of the first frequency band from the at least one external electronic device.

18. The electronic device of claim 16, further comprising a third conductive pattern disposed on the one surface of the second support structure that faces the rear surface plate, and electrically connected with the wireless communication circuit.

19. The electronic device of claim 18, wherein the third conductive pattern is configured to operate as an antenna radiator to transmit or receive an RF signal of a second frequency band which is different from the first frequency band.

20. An electronic device comprising:
a housing comprising:
   a front surface plate forming a front surface of the electronic device,
   a rear surface plate forming a rear surface of the electronic device, and
   a side surface member forming a side surface of the electronic device,
   wherein the side surface member of the housing comprises:
     a first conductive portion,
     a first nonconductive portion disposed on one end of the first conductive portion, and
     a second nonconductive portion disposed on the other end of the first conductive portion;
a support structure formed with a nonconductive material;
a first conductive pattern disposed on one surface of the support structure that faces the rear surface plate;
a second conductive pattern disposed on the one surface of the support structure that faces the rear surface plate and disposed to be spaced apart from the first conductive pattern;
a printed circuit board positioned within the housing and comprising a ground; and
a wireless communication circuit disposed on the printed circuit board, and electrically connected with the first conductive portion of the side surface member, the first conductive pattern, and the second conductive pattern,
wherein the first conductive pattern is fed from the wireless communication circuit at a first point,
wherein the second conductive pattern is fed from the wireless communication circuit at a second point, and
wherein the first conductive portion of the side surface member is fed from the wireless communication circuit at a third point, and is grounded to the ground of the printed circuit board at a fourth point, which is spaced apart from the third point.

* * * * *